(12) United States Patent
Inagaki

(10) Patent No.: US 11,455,743 B2
(45) Date of Patent: Sep. 27, 2022

(54) SHOOTING CONTROL APPARATUS, IMAGE CAPTURING APPARATUS, SHOOTING CONTROL METHOD, AND STORAGE MEDIUM

(71) Applicant: CANON KABUSHIKI KAISHA, Tokyo (JP)

(72) Inventor: Yu Inagaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/173,719

(22) Filed: Feb. 11, 2021

(65) Prior Publication Data

US 2021/0256726 A1 Aug. 19, 2021

(30) Foreign Application Priority Data

Feb. 19, 2020 (JP) .............................. JP2020-026471

(51) Int. Cl.
| | |
|---|---|
| *G06T 7/70* | (2017.01) |
| *H04N 5/232* | (2006.01) |
| *G06T 7/50* | (2017.01) |
| *H04N 9/73* | (2006.01) |

(52) U.S. Cl.
CPC ................. *G06T 7/70* (2017.01); *G06T 7/50* (2017.01); *H04N 5/23218* (2018.08); *H04N 5/232125* (2018.08); *G06T 2207/20076* (2013.01); *H04N 5/23296* (2013.01); *H04N 5/232122* (2018.08); *H04N 9/73* (2013.01)

(58) Field of Classification Search
CPC ........... H04N 5/232125; H04N 5/2352; H04N 5/36961; H04N 5/23218; H04N 5/232127; H04N 5/23296; H04N 5/232122; H04N 9/73; G06T 7/70; G06T 7/50; G06T 2207/20076
USPC ....................................................... 348/294
See application file for complete search history.

(56) References Cited

U.S. PATENT DOCUMENTS

| | | | |
|---|---|---|---|
| 10,200,590 B2 * | 2/2019 | Yamazaki | ........ H04N 5/232945 |
| 10,484,591 B2 * | 11/2019 | Tsuji | ........................ G03B 17/14 |
| 10,638,033 B2 * | 4/2020 | Tomosada | ........ H04N 5/232123 |
| 11,115,583 B2 * | 9/2021 | Kudo | .................. H04N 5/23219 |
| 2014/0253787 A1 * | 9/2014 | Shu | .......................... G02B 7/34 |
| | | | 348/349 |
| 2016/0044218 A1 * | 2/2016 | Adelson | ............... G01B 11/303 |
| | | | 348/128 |

(Continued)

FOREIGN PATENT DOCUMENTS

| | | |
|---|---|---|
| JP | 2009192774 A | 8/2009 |
| JP | 2018-113660 A | 7/2018 |

*Primary Examiner* — Pritham D Prabhakher
(74) *Attorney, Agent, or Firm* — Canon U.S.A., Inc. IP Division

(57) ABSTRACT

Based on captured image data, a detection unit detects a subject area that partially includes a subject to be detected. A control unit performs shooting control based on data corresponding to the subject area among the captured image data, and on a distribution of existence probabilities of the subject in the subject area. The distribution is stored in a memory. The control unit performs the shooting control so that a contribution of data corresponding to a position with a first existence probability is larger than a contribution of data corresponding to a position with a second existence probability that is lower than the first existence probability.

19 Claims, 15 Drawing Sheets

(56) References Cited

U.S. PATENT DOCUMENTS

| | | | |
|---|---|---|---|
| 2017/0034421 A1* | 2/2017 | Yamazaki | H04N 5/232945 |
| 2018/0007254 A1* | 1/2018 | Tsuji | H04N 9/045 |
| 2018/0063411 A1* | 3/2018 | Rivard | H04N 5/23219 |
| 2018/0063415 A1* | 3/2018 | Hongu | H04N 5/23219 |
| 2019/0045133 A1* | 2/2019 | Tomosada | H04N 5/23219 |
| 2019/0215440 A1* | 7/2019 | Rivard | G02B 27/28 |
| 2019/0342491 A1* | 11/2019 | Mandavilli | H04N 5/23219 |
| 2020/0007780 A1* | 1/2020 | Kudo | G06V 40/161 |
| 2020/0045237 A1* | 2/2020 | Miyazawa | H04N 5/232127 |
| 2020/0236292 A1* | 7/2020 | Miyazawa | H04N 5/232127 |

* cited by examiner

PLAN VIEW a-a CROSS-SECTIONAL VIEW

FIG. 11
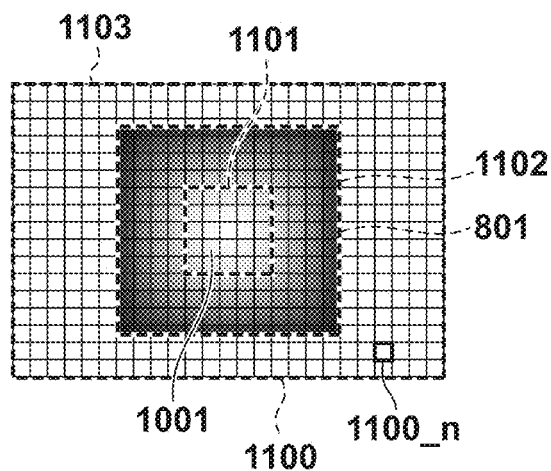
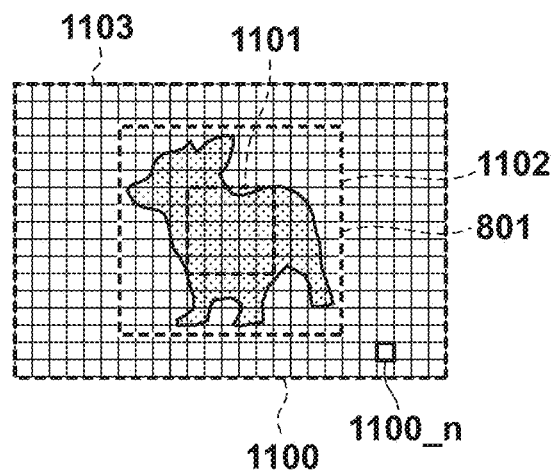
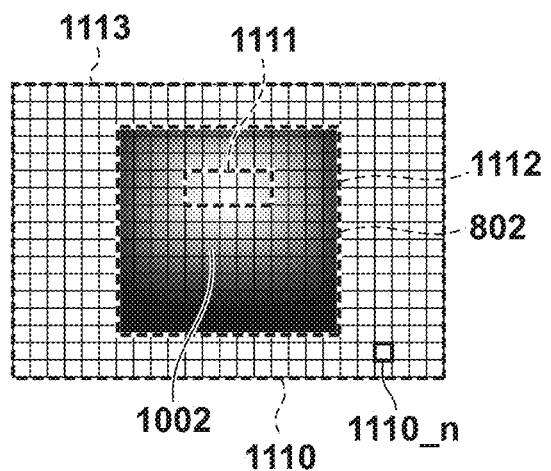
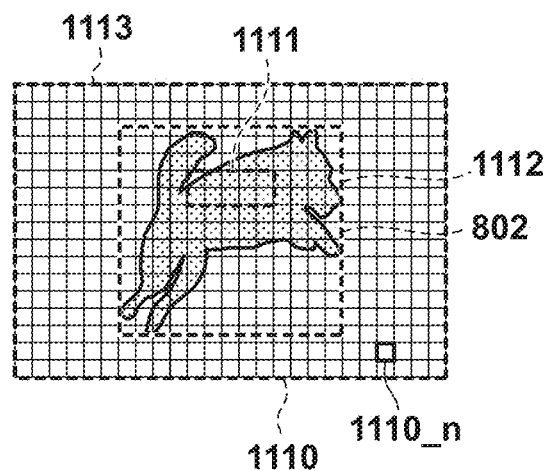

FIG. 15
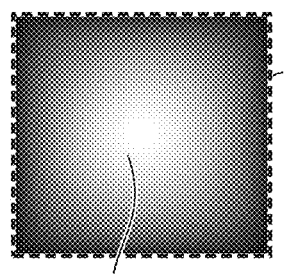 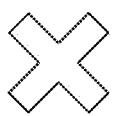 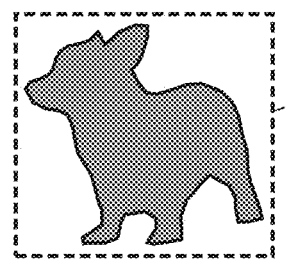
801  801
1001
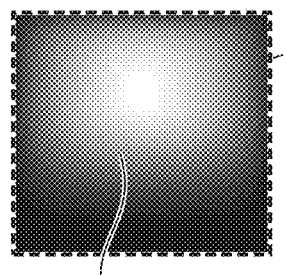 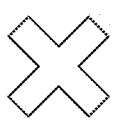 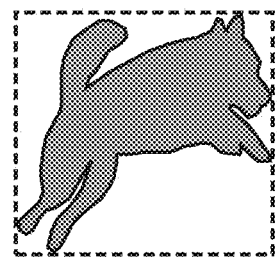
802  802
1002

SHOOTING CONTROL APPARATUS, IMAGE CAPTURING APPARATUS, SHOOTING CONTROL METHOD, AND STORAGE MEDIUM

BACKGROUND OF THE DISCLOSURE

Field of the Disclosure

The aspect of the embodiments relates to a shooting control apparatus, an image capturing apparatus, a shooting control method, and a storage medium.

Description of the Related Art

There is a conventionally known method of performing focus adjustment by detecting a subject and performing ranging computation in a detected section. With the technique of Japanese Patent Laid-Open No. 2009-192774, optimal ranging that suits a subject can be performed by determining a detection direction of a focus detection signal in accordance with a detected location of a subject.

In general subject detection processing, an area in which a subject to be detected exists and an area in which the subject does not exist are not strictly distinguished from each other, and an area that also includes an area in which the subject to be detected does not exist (e.g., a background area) is detected as a subject area. Therefore, for example, even when focus adjustment (focus control) has been performed based on a subject area, there is a possibility that an area in which a subject to be detected does not exist (e.g., a background area) is brought into focus. In this regard, the same goes for a case where shooting control other than focus control (e.g., exposure control) is performed; even when shooting control has been performed based on a subject area, it is not necessarily the case that a control result appropriate for a subject to be detected is obtained.

SUMMARY OF THE DISCLOSURE

According to a first aspect of the embodiments, there is provided an apparatus, comprising: one or more processors; and a first memory coupled to the one or more processors storing instructions which, when executed by the one or more processors, cause the one or more processors to function as: a detection unit configured to, based on captured image data, detect a subject area that partially includes a subject to be detected; and a control unit configured to perform shooting control based on data corresponding to the subject area among the captured image data, and on a distribution of existence probabilities of the subject in the subject area, the distribution being stored in a second memory, the control unit performing the shooting control so that a contribution of data corresponding to a position with a first existence probability is larger than a contribution of data corresponding to a position with a second existence probability that is lower than the first existence probability.

According to a second aspect of the embodiments, there is provided an image capturing apparatus, comprising: the apparatus according to the first aspect; and an image sensor configured to generate the captured image data.

According to a third aspect of the embodiments, there is provided an apparatus, comprising: one or more processors; and a first memory coupled to the one or more processors storing instructions which, when executed by the one or more processors, cause the one or more processors to function as: a detection unit configured to, based on captured image data, detect a subject area that partially includes a subject to be detected; an identification unit configured to identify a specific distance range in which a probability that the subject exists reaches a threshold based on information that defines a relationship between a distance range from a center of the subject area and a probability that the subject exists in at least a part of an area inside the distance range, the information being stored in a second memory; and a control unit configured to perform shooting control based on data corresponding to the subject area among the captured image data, and on the specific distance range, the control unit performing the shooting control so that a contribution of data corresponding to a position inside the specific distance range is larger than a contribution of data corresponding to a position outside the specific distance range.

According to a fourth aspect of the embodiments, there is provided an image capturing apparatus, comprising: the apparatus according to the third aspect; and an image sensor configured to generate the captured image data.

According to a fifth aspect of the embodiments, there is provided an apparatus, comprising: one or more processors; and a first memory coupled to the one or more processors storing instructions which, when executed by the one or more processors, cause the one or more processors to function as: a detection unit configured to, based on captured image data captured by an image capturing unit, detect a subject area that at least partially includes a subject to be detected; and a control unit configured to perform shooting control of the image capturing unit based on the captured image data while making area-by-area weights vary in accordance with a subject type with respect to the subject area detected by the detection unit in the captured image data.

According to a sixth aspect of the embodiments, there is provided a method comprising: based on captured image data, detecting a subject area that partially includes a subject to be detected; and performing shooting control based on data corresponding to the subject area among the captured image data, and on a distribution of existence probabilities of the subject in the subject area, the distribution being stored in a memory, the shooting control being performed so that a contribution of data corresponding to a position with a first existence probability is larger than a contribution of data corresponding to a position with a second existence probability that is lower than the first existence probability.

According to a seventh aspect of the embodiments, there is provided a method comprising: based on captured image data, detecting a subject area that partially includes a subject to be detected; identifying a specific distance range in which a probability that the subject exists reaches a threshold based on information that defines a relationship between a distance range from a center of the subject area and a probability that the subject exists in at least a part of an area inside the distance range, the information being stored in a memory; and performing shooting control based on data corresponding to the subject area among the captured image data, and on the specific distance range, the shooting control being performed so that a contribution of data corresponding to a position inside the specific distance range is larger than a contribution of data corresponding to a position outside the specific distance range.

According to an eighth aspect of the embodiments, there is provided a non-transitory computer-readable storage medium which stores a program for causing a computer to execute a method comprising: based on captured image data, detecting a subject area that partially includes a subject to be detected; and performing shooting control based on data corresponding to the subject area among the captured image data, and on a distribution of existence probabilities of the subject in the subject area, the distribution being stored in a memory, the shooting control being performed so that a contribution of data corresponding to a position with a first existence probability is larger than a contribution of data corresponding to a position with a second existence probability that is lower than the first existence probability.

According to a ninth aspect of the embodiments, there is provided a non-transitory computer-readable storage medium which stores a program for causing a computer to execute a method comprising: based on captured image data, detecting a subject area that partially includes a subject to be detected; identifying a specific distance range in which a probability that the subject exists reaches a threshold based on information that defines a relationship between a distance range from a center of the subject area and a probability that the subject exists in at least a part of an area inside the distance range, the information being stored in a memory; and performing shooting control based on data corresponding to the subject area among the captured image data, and on the specific distance range, the shooting control being performed so that a contribution of data corresponding to a position inside the specific distance range is larger than a contribution of data corresponding to a position outside the specific distance range.

Further features of the disclosure will become apparent from the following description of exemplary embodiments with reference to the attached drawings.

BRIEF DESCRIPTION OF THE DRAWINGS

FIG. 11 is a schematic explanatory diagram of the setting of priority ranks inside a ranging area.

FIG. 15 is a schematic explanatory diagram of the setting of weights inside a subject area, which are used in calculation of an exposure amount.

DESCRIPTION OF THE EMBODIMENTS

Figure 1:
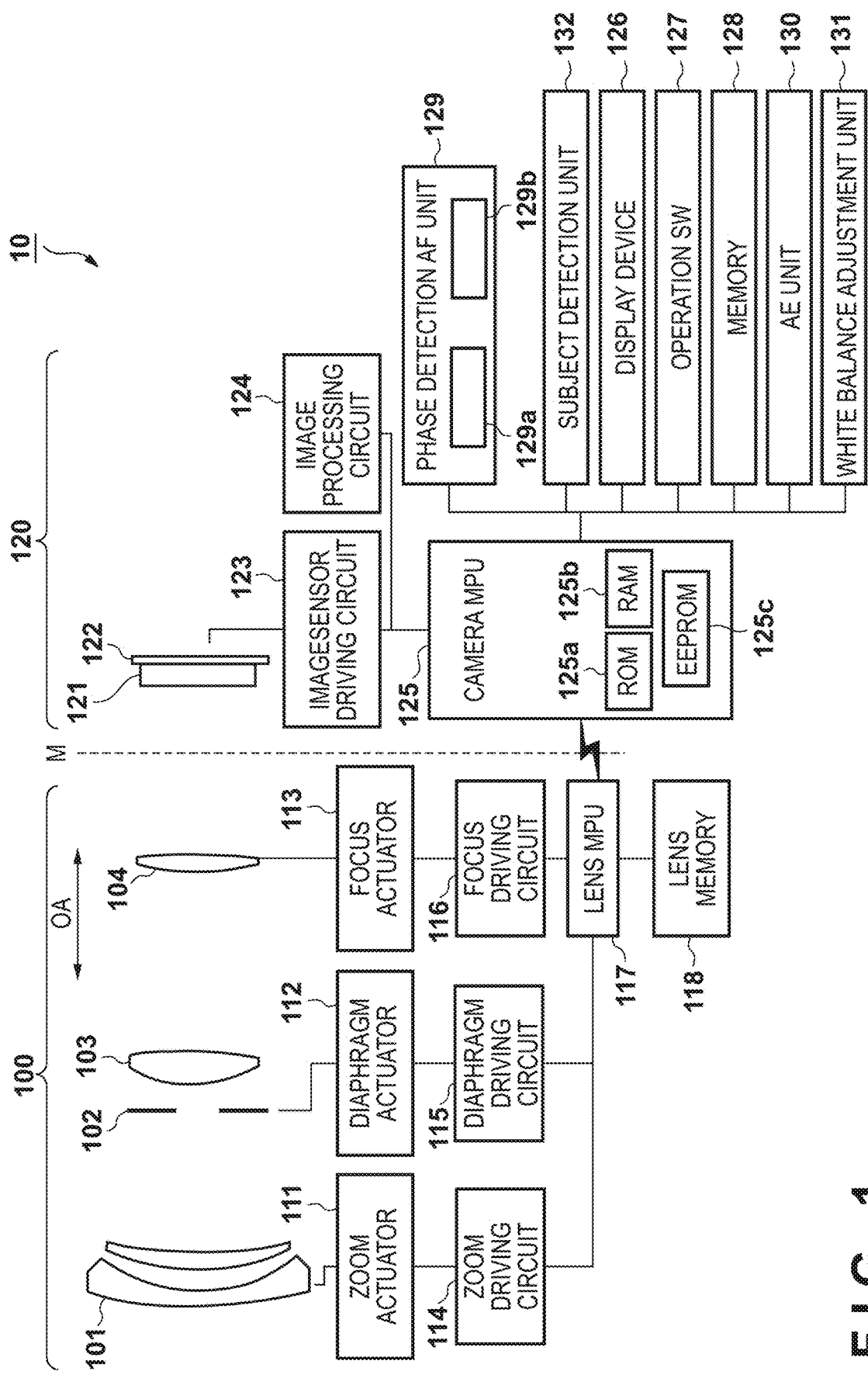
FIG. 1 is a block diagram showing a configuration of an image capturing apparatus 10 that includes an image capturing control apparatus.

Hereinafter, embodiments will be described in detail with reference to the attached drawings. Note, the following embodiments are not intended to limit the scope of the disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

Configuration of Image Capturing Apparatus 10

FIG. 1 is a block diagram showing a configuration of an image capturing apparatus 10 that includes an image capturing control apparatus. In an example of FIG. 1, the image capturing apparatus 10 is a single-lens reflex digital camera that allows a lens to be exchanged. The image capturing apparatus 10 is in the form of a camera system that includes a lens unit 100 (interchangeable lens) and a camera main body 120. The lens unit 100 is removably attached to the camera main body 120 via a mount M indicated by a dash line in FIG. 1. However, the present embodiment is not limited to the configuration shown in FIG. 1, and is also applicable to an image capturing apparatus (digital camera) in which a lens unit (image capturing optical system) and a camera main body are integrally configured. Furthermore, the present embodiment is not limited to a digital camera, and is also applicable to other image capturing apparatuses, such as a video camera.

The lens unit 100 includes a first lens assembly 101, a diaphragm 102, a second lens assembly 103, and a focus lens assembly (hereinafter simply referred to as "focus lens") 104 as an optical system, and a driving/control system. Thus, the lens unit 100 is a shooting lens (image capturing optical system) that includes the focus lens 104 and forms a subject image.

The first lens assembly 101 is disposed at a front end of the lens unit 100, and is held in such a manner that it can advance and recede in an optical axis direction OA. The diaphragm 102 adjusts a light amount at the time of shooting by adjusting its aperture diameter, and also functions as a shutter for adjusting exposure time in seconds at the time of still image shooting. The diaphragm 102 and the second lens assembly 103 can integrally move in the optical axis direction OA, and realize a zoom function in coordination with the advancing/receding operation of the first lens assembly 101. The focus lens 104 can move in the optical axis direction OA, and depending on its position, a distance of a subject on which the lens unit 100 focuses (focus distance) changes. Controlling the position of the focus lens 104 in the optical axis direction OA enables focus adjustment whereby the focus distance of the lens unit 100 is adjusted (focus control).

The driving/control system includes a zoom actuator 111, a diaphragm actuator 112, a focus actuator 113, a zoom driving circuit 114, a diaphragm driving circuit 115, a focus driving circuit 116, a lens MPU 117, and a lens memory 118. Using the zoom actuator 111, the zoom driving circuit 114 drives the first lens assembly 101 and the second lens assembly 103 in the optical axis direction OA, and controls an angle of view of the optical system of the lens unit 100 (performs a zoom operation). Using the diaphragm actuator 112, the diaphragm driving circuit 115 drives the diaphragm 102, and controls the aperture diameter and the opening/closing operation of the diaphragm 102. Using the focus actuator 113, the focus driving circuit 116 drives the focus lens 104 in the optical axis direction OA, and controls the focus distance of the optical system of the lens unit 100 (performs focus control). Also, the focus driving circuit 116 has a function of a position detection unit that detects a current position (lens position) of the focus lens 104 with use of the focus actuator 113.

The lens MPU 117 (processor) performs all of the computation and control pertaining to the lens unit 100, and controls the zoom driving circuit 114, the diaphragm driving circuit 115, and the focus driving circuit 116. Also, the lens MPU 117 is connected to a camera MPU 125 via the mount M, and communicates commands and data. For example, the lens MPU 117 detects a position of the focus lens 104, and gives notice of lens position information in response to a request from the camera MPU 125. This lens position information includes information of, for example, a position of the focus lens 104 in the optical axis direction OA, a position in the optical axis direction OA and a diameter of an exit pupil in a state where the optical system has not moved, and a position in the optical axis direction OA and a diameter of a lens frame that restricts light beams in the exit pupil. Furthermore, the lens MPU 117 controls the zoom driving circuit 114, the diaphragm driving circuit 115, and the focus driving circuit 116 in response to a request from the camera MPU 125. The lens memory 118 stores optical information for automatic focus adjustment (AF control). The camera MPU 125 controls the operations of the lens unit 100 by, for example, executing a program stored in a built-in nonvolatile memory or the lens memory 118.

The camera main body 120 includes an optical low-pass filter 121, an image sensor 122, and a driving/control system. The optical low-pass filter 121 and the image sensor 122 function as an image capturing unit (image capturing unit) that photoelectrically converts a subject image (optical image) formed via the lens unit 100 and outputs image data. In the present embodiment, the image sensor 122 photoelectrically converts a subject image formed via a shooting optical system, and outputs a captured image signal and focus detection signals individually as image data. Furthermore, in the present embodiment, the first lens assembly 101, the diaphragm 102, the second lens assembly 103, the focus lens 104, and the optical low-pass filter 121 compose the image capturing optical system.

The optical low-pass filter 121 reduces false color and moiré of a shot image. In the image sensor 122, which is composed of a CMOS image sensor and peripheral circuits thereof, m pixels and n pixels are arranged in a horizontal direction and a vertical direction, respectively (where m, n are integers equal to or larger than two). The image sensor 122 of the present embodiment also plays the role of a focus detection element, has a pupil division function, and includes pupil division pixels capable of focus detection of a phase-difference detection method (phase detection AF) with use of image data (image signals). Based on image data output from the image sensor 122, an image processing circuit 124 generates data for phase detection AF and image data for display, recording, and subject detection.

The driving/control system includes an image sensor driving circuit 123, the image processing circuit 124, the camera MPU 125, a display device 126, an operation switch assembly (operation SW) 127, a memory 128, a phase detection AF unit 129 (image capturing surface phase difference focus detection unit, shooting condition computation unit), an AE unit 130 (shooting condition computation unit), a white balance adjustment unit 131 (shooting condition computation unit), and a subject detection unit 132 (detection unit). The image sensor driving circuit 123 controls the operations of the image sensor 122, applies A/D conversion to image signals (image data) output from the image sensor 122, and transmits the resultant image signals to the camera MPU 125. The image processing circuit 124 performs general image processing that is performed in a digital camera, such as γ conversion, color interpolation processing, and compression encoding processing, with respect to image signals output from the image sensor 122. Also, the image processing circuit 124 generates a signal for phase detection AF, a signal for AE, a signal for white balance adjustment, and a signal for subject detection. In the present embodiment, the signal for phase detection AF, the signal for AE, the signal for white balance adjustment, and the signal for subject detection are generated individually; however, for example, the signal for AE, the signal for white balance adjustment, and the signal for subject detection may be generated as the same signal. Furthermore, the combination of signals that are used as the same signal is not limited to the foregoing.

The camera MPU 125 (processor, control apparatus) performs all of the computation and control pertaining to the camera main body 120. That is to say, the camera MPU 125 controls the image sensor driving circuit 123, the image processing circuit 124, the display device 126, the operation switch assembly 127, the memory 128, the phase detection AF unit 129, the AE unit 130, the white balance adjustment unit 131, and the subject detection unit 132. The camera MPU 125 is connected to the lens MPU 117 via a signal wire of the mount M, and communicates commands and data with the lens MPU 117. The camera MPU 125 issues requests for obtainment of a lens position and for lens driving of a predetermined driving amount to the lens MPU 117, and issues, from the lens MPU 117, a request for obtainment of optical information that is unique to the lens unit 100 and the like.

A ROM 125a that stores a program for controlling the operations of the camera main body 120, a RAM 125b (camera memory) that stores variables, and an EEPROM 125c that stores various types of parameters are built in the camera MPU 125. Also, the camera MPU 125 executes focus detection processing based on the program stored in the ROM 125a. In the focus detection processing, known correlation computation processing is executed using a pair of image signals obtained by photoelectrically converting optical images formed by light beams that have passed through different pupil areas (pupil partial areas) in the image capturing optical system.

The display device 126 is composed of, for example, an LCD, and displays information related to a shooting mode of the image capturing apparatus 10, a preview image before shooting, an image for confirmation after shooting, an in-focus state display image at the time of focus detection, and so forth. The operation switch assembly 127 is composed of a power source switch, a release (shooting trigger) switch, a zoom operation switch, a shooting mode selection switch, and so forth. The memory 128 (recording unit) is a removable flash memory, and images that have already been shot are recorded therein.

The phase detection AF unit 129 performs focus detection processing of a phase-difference detection method based on an image signal of image data for focus detection obtained from the image sensor 122 and the image processing circuit 124 (a signal for phase detection AF). More specifically, the image processing circuit 124 generates a pair of image data pieces, which is formed by light beams that pass through a pair of pupil areas in the image capturing optical system, as data for focus detection, and the phase detection AF unit 129 detects a focus displacement amount based on an amount of displacement between the pair of image data pieces. In this way, the phase detection AF unit 129 of the present embodiment performs phase detection AF based on an output from the image sensor 122 (image capturing surface phase detection AF) without using a dedicated AF sensor. In the present embodiment, the phase detection AF unit 129 includes an obtainment unit 129a and a calculation unit 129b. The operations each of these units will be described later.

Note that at least a part of the phase detection AF unit 129 (a part of the obtainment unit 129a or the calculation unit 129b) may be provided in the camera MPU 125. The details of the operations of the phase detection AF unit 129 will be described later. The phase detection AF unit 129 functions as a focus control unit that controls a position of the focus lens 104 with use of the result of focus detection.

The AE unit 130 performs exposure adjustment processing for making shooting conditions appropriate by performing photometry based on a signal for AE obtained from the image sensor 122 and the image processing circuit 124. Specifically, photometry is performed based on a signal for AE, and an exposure amount corresponding to the f-number, the shutter speed, and the ISO film speed that are currently set is calculated. Exposure adjustment processing is performed by computing an appropriate f-number, shutter speed, and ISO film speed to be set at the time of shooting from the difference between the calculated exposure amount and a proper exposure amount that has been set in advance, and by setting the results of the computation as shooting conditions. The AE unit 130 functions as an exposure adjustment unit that calculates exposure conditions at the time of shooting with use of the results of photometry, and controls the f-number, the shutter speed, and the ISO film speed of the diaphragm 102.

The white balance adjustment unit 131 performs white balance adjustment processing based on a signal for white balance adjustment obtained from the image sensor 122 and the image processing circuit 124. Specifically, white balance adjustment processing is performed by calculating white balance of a signal for white balance adjustment, and by adjusting the weights of colors based on the difference from appropriate white balance that has been set in advance.

The subject detection unit 132 performs subject detection processing based on a signal for subject detection generated by the image processing circuit 124. The type and state (detection attribute) of a subject, as well as the position and size (detection area) of the subject, are detected through subject detection processing. Note that the details of the operations of the subject detection unit 132 will be described later.

As described above, the image capturing apparatus 10 of the present embodiment can execute phase detection AF, photometry (exposure adjustment), white balance adjustment, and subject detection in combination, and the position (image height range) in which phase detection AF, photometry, and white balance adjustment are performed can be selected in accordance with the result of subject detection.

Configuration of Image Sensor 122

Figure 2:
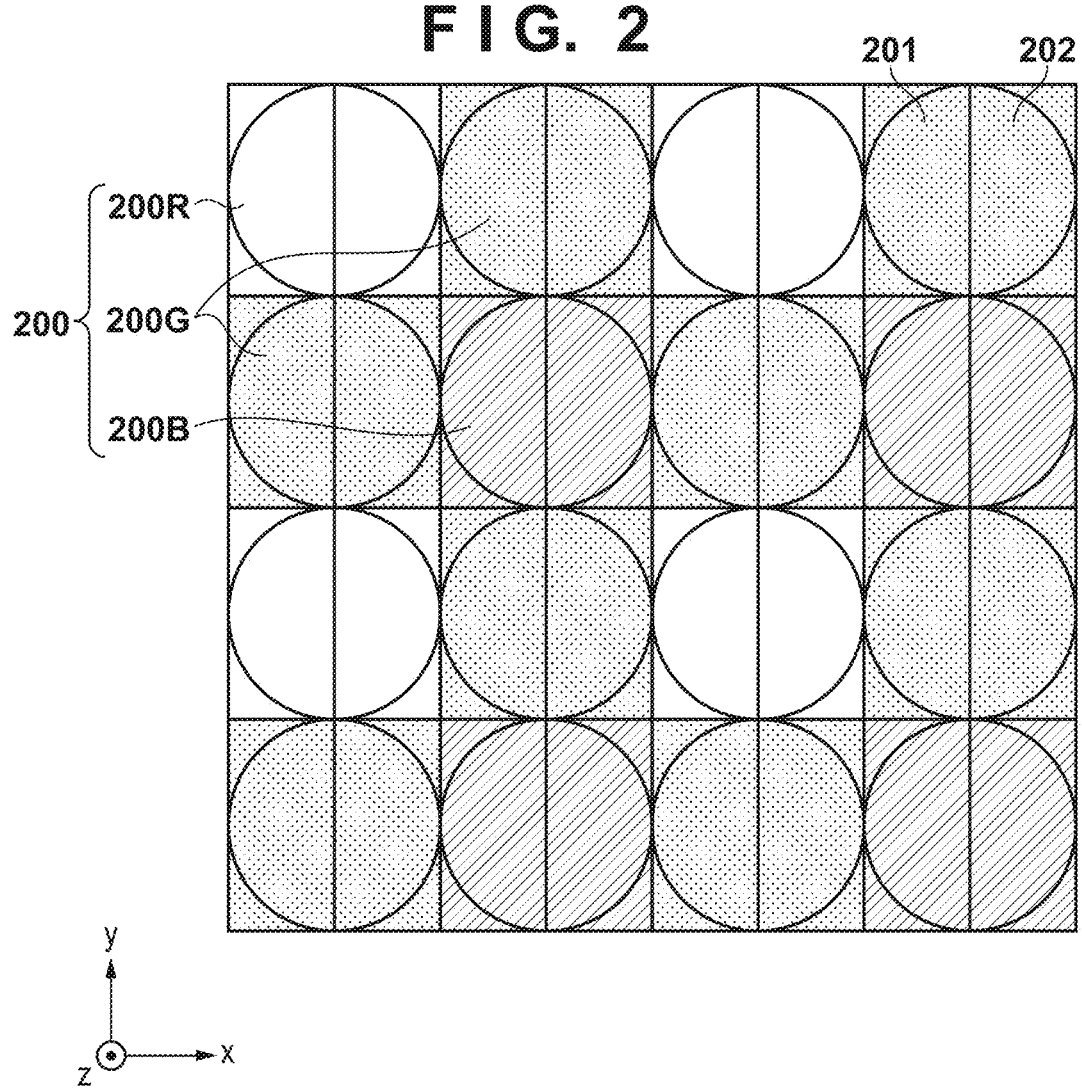
FIG. 2 is a schematic diagram of the arrangement of image capturing pixels (and focus detection pixels) of an image sensor 122.

FIG. 2 is a schematic diagram of the arrangement of image capturing pixels (and focus detection pixels) of the image sensor 122. FIG. 2 shows the arrangement of pixels (image capturing pixels) of the two-dimensional CMOS sensor (image sensor 122) of the present embodiment in a range of four columns×four rows, and the arrangement of focus detection pixels in a range of eight columns×four rows. In the first embodiment, in a pixel group 200 having two columns×two rows shown in FIG. 2, a pixel 200R having a spectral sensitivity for R (red) is arranged in the upper left, pixels 200G having a spectral sensitivity for G (green) are arranged in the upper right and the lower left, and a pixel 200B having a spectral sensitivity for B (blue) is arranged in the lower right. Furthermore, each pixel is composed of a first focus detection pixel 201 and a second focus detection pixel 202 that are arranged in two columns× one row.

A captured image (focus detection signals) can be obtained as a large number of four column×four row pixels (eight column×four row focus detection pixels) shown in FIG. 2 are arranged on a surface. In the present embodiment, it is assumed that a period P of pixels is 4 µm, the number of pixels N is 5575 columns horizontally×3725 rows vertically=approximately 20750000 pixels, a column-direction period PAF of focus detection pixels is 2 µm, and the number of focus detection pixels NAF is 11150 columns horizontally×3725 rows vertically=approximately 41500000 pixels.

Figure 3A:
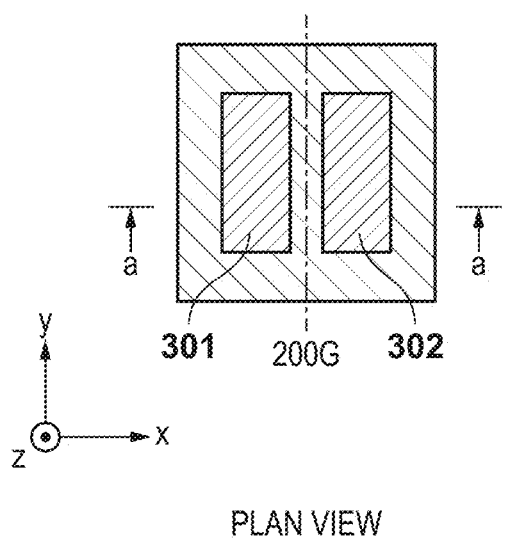
FIG. 3A is a plan view of one pixel 200G of the image sensor 122 shown in FIG. 2 as viewed from the light-receiving surface side (+z side) of the image sensor 122.
Figure 3B:
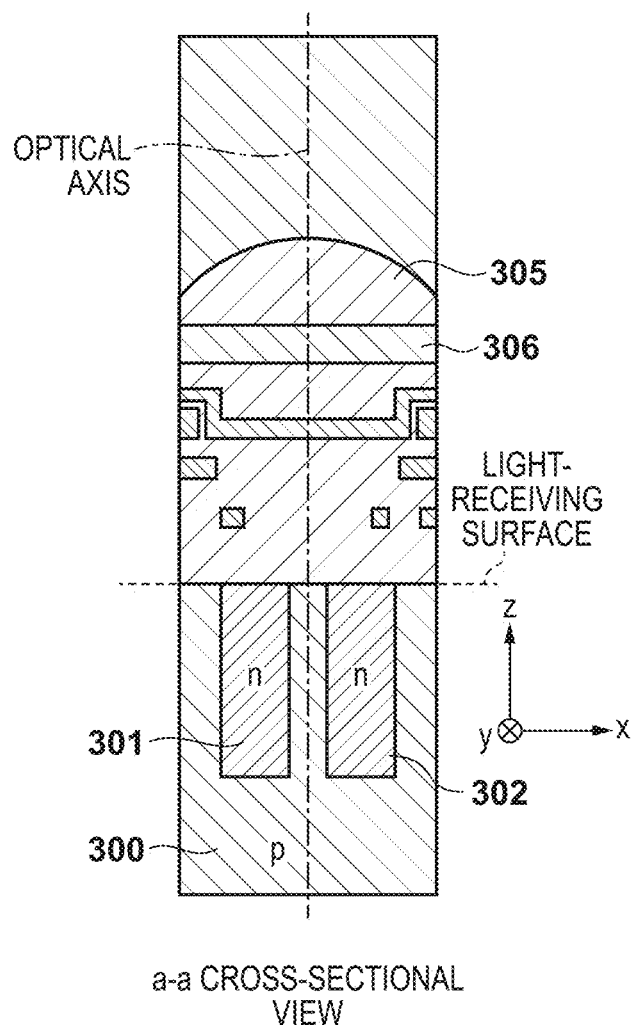
FIG. 3B is a cross-sectional view of an a-a cross section of FIG. 3A as viewed from the −y side.

FIG. 3A is a plan view of one pixel 200G of the image sensor 122 shown in FIG. 2 as viewed from the light-receiving surface side (+z side) of the image sensor 122, whereas FIG. 3B is a cross-sectional view of an a-a cross section of FIG. 3A as viewed from the −y side.

As shown in FIGS. 3A and 3B, in the pixel 200G of the present embodiment, a microlens 305 for collecting incident light is formed on the light-receiving side of each pixel, and a photoelectric conversion unit 301 and a photoelectric conversion unit 302 are formed as a result of division into NH (two) in the x direction and division into NV (one) in the y direction. The photoelectric conversion unit 301 and the photoelectric conversion unit 302 respectively correspond to the first focus detection pixel 201 and the second focus detection pixel 202.

The photoelectric conversion unit 301 and the photoelectric conversion unit 302 may be pin-structure photodiodes in which an intrinsic layer is sandwiched between a p-type layer and an n-type layer, or may be a p-n junction photodiode in which an intrinsic layer is omitted where appropriate. In each pixel, a color filter 306 is formed between the microlens 305 and the photoelectric conversion units 301, 302. Also, where necessary, the spectral transmittance of the color filter 306 may vary with each sub-pixel, or the color filter 306 may be omitted.

Light incident on the pixel 200G shown in FIGS. 3A and 3B is collected by the microlens 305, dispersed by the color filter 306, and then received by the photoelectric conversion unit 301 and the photoelectric conversion unit 302. In the photoelectric conversion unit 301 and the photoelectric conversion unit 302, electron-hole pairs are generated in accordance with the amount of received light, and separated in a depletion layer; then, negatively-charged electrons are accumulated in the n-type layer (not shown). On the other hand, holes are discharged to the outside of the image sensor 122 via the p-type layer connected to a constant-voltage source (not shown). The electrons accumulated in the n-type layers (not shown) of the photoelectric conversion unit 301 and the photoelectric conversion unit 302 are transferred to a capacitance unit (FD) via a transfer gate, and converted into a voltage signal.

Figure 4:
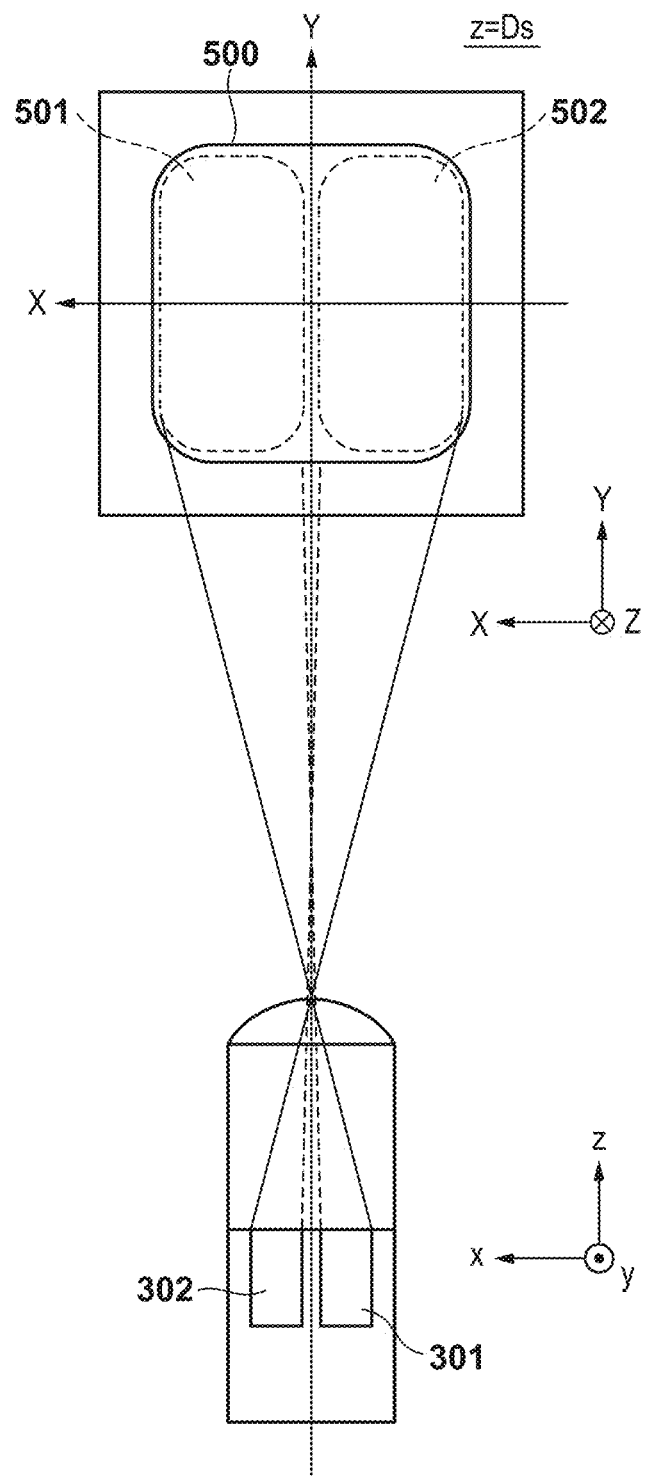
FIG. 4 is a schematic explanatory diagram showing a correspondence relationship between a pixel structure of the present embodiment shown in FIGS. 3A and 3B and pupil division.

FIG. 4 is a schematic explanatory diagram showing a correspondence relationship between the pixel structure of the present embodiment shown in FIGS. 3A and 3B and pupil division. FIG. 4 shows a cross-sectional view of the a-a cross section of the pixel structure of the present embodiment shown in FIG. 3A as viewed from the +y side, and a pupil surface of the image sensor 122 (pupil distance Ds). In FIG. 4, for the sake of correspondence with the coordinate axes of the pupil surface of the image sensor 122, the x-axis and the y-axis of the cross-sectional view are inverted relative to FIGS. 3A and 3B.

In FIG. 4, a first pupil partial area 501 for the first focus detection pixel 201 is substantially in a conjugate relationship with a light-receiving surface of the photoelectric conversion unit 301, whose center of mass is decentered in the −x direction, due to the microlens, and represents a pupil area via which light can be received by the first focus detection pixel 201. The center of mass of the first pupil partial area 501 for the first focus detection pixel 201 is decentered toward the +X side on the pupil surface. In FIG. 4, a second pupil partial area 502 for the second focus detection pixel 202 is substantially in a conjugate relationship with a light-receiving surface of the photoelectric conversion unit 302, whose center of mass is decentered in the +x direction, due to the microlens, and represents a pupil area via which light can be received by the second focus detection pixel 202. The center of mass of the second pupil partial area 502 for the second focus detection pixel 202 is decentered toward the −X side on the pupil surface. Furthermore, in FIG. 4, a pupil area 500 is a pupil area via which light can be received by the entire pixel 200G, with all of the photoelectric conversion unit 301 and the photoelectric conversion unit 302 (the first focus detection pixel 201 and the second focus detection pixel 202) combined.

Image capturing surface phase detection AF is affected by diffraction because pupil division is performed using the microlenses of the image sensor. In FIG. 4, as opposed to a pupil distance of several tens of mm to the pupil surface of the image sensor, the diameter of the microlenses is several μm. As a result, the f-number of the microlenses becomes several tens of thousands, and a diffraction blur occurs at the level of several tens of mm. Therefore, images on the light-receiving surfaces of the photoelectric conversion units represent the properties of light-receiving sensitivity (the incidence angle distribution of light receiving rates), rather than clear pupil areas or pupil partial areas.

Figure 5:
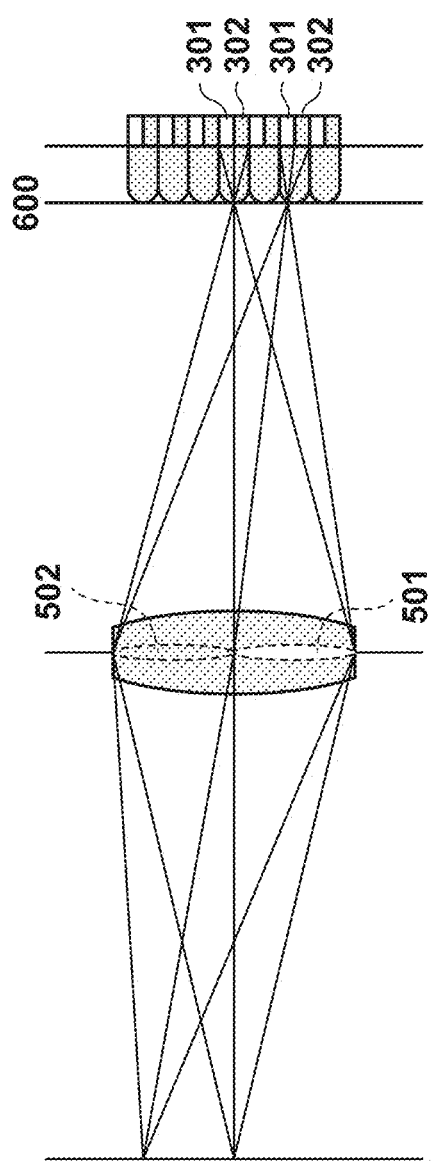
FIG. 5 is a schematic diagram showing a correspondence relationship between the image sensor 122 and pupil division.

FIG. 5 is a schematic diagram showing a correspondence relationship between the image sensor 122 and pupil division. The image sensor 122 is arranged on an image capturing surface 600. Light beams that have passed through different pupil partial areas in the first pupil partial area 501 and the second pupil partial area 502 are incident on respective pixels of the image sensor 122 at different angles, and received by the first focus detection pixel 201 and the second focus detection pixel 202, which are formed by 2×1 division. The present embodiment is an example in which a pupil area has been divided into two in the horizontal direction. Pupil division may be performed in the vertical direction where necessary.

A plurality of image capturing pixels that include the first focus detection pixel 201 and the second focus detection pixel 202 are arranged in the image sensor 122 of the present embodiment. The first focus detection pixel 201 receives light beams that pass through the first pupil partial area 501 of the shooting optical system. On the other hand, the second focus detection pixel 202 receives light beams that pass through the second pupil partial area 502 of the shooting optical system, which is different from the first pupil partial area 501. Furthermore, the image capturing pixel receives light beams that pass through a pupil area representing the combination of the first pupil partial area 501 and the second pupil partial area 502 of the shooting optical system.

In the image sensor 122 of the present embodiment, each image capturing pixel is composed of the first focus detection pixel 201 and the second focus detection pixel 202. Where necessary, it is permissible to adopt a configuration in which the image capturing pixels, the first focus detection pixels 201, and the second focus detection pixels 202 are discrete pixel components, and the first focus detection pixels 201 and the second focus detection pixels 202 are partially arranged in parts of the arrangement of the image capturing pixels.

In the present embodiment, focus detection is performed by collecting received light signals of the first focus detection pixels 201 in respective pixels of the image sensor 122 to generate a first focus signal, and collecting received light signals of the second focus detection pixels 202 in respective pixels to generate a second focus signal. Furthermore, signals of the first focus detection pixel 201 and the second focus detection pixel 202 are added on a per-pixel basis in the image sensor 122, thereby generating a captured image signal (captured image) with a resolution corresponding to N effective pixels. A method of generating each signal is not limited to the foregoing method; for example, the second focus detection signal may be generated from the difference between the captured image signal and the first focus signal.

Relationship Between Defocus Amount and Image Displacement Amount

The following describes a relationship between a defocus amount and an image displacement amount based on the first focus detection signal and the second focus detection signal obtained by the image sensor 122 of the present embodiment.

Figure 6:
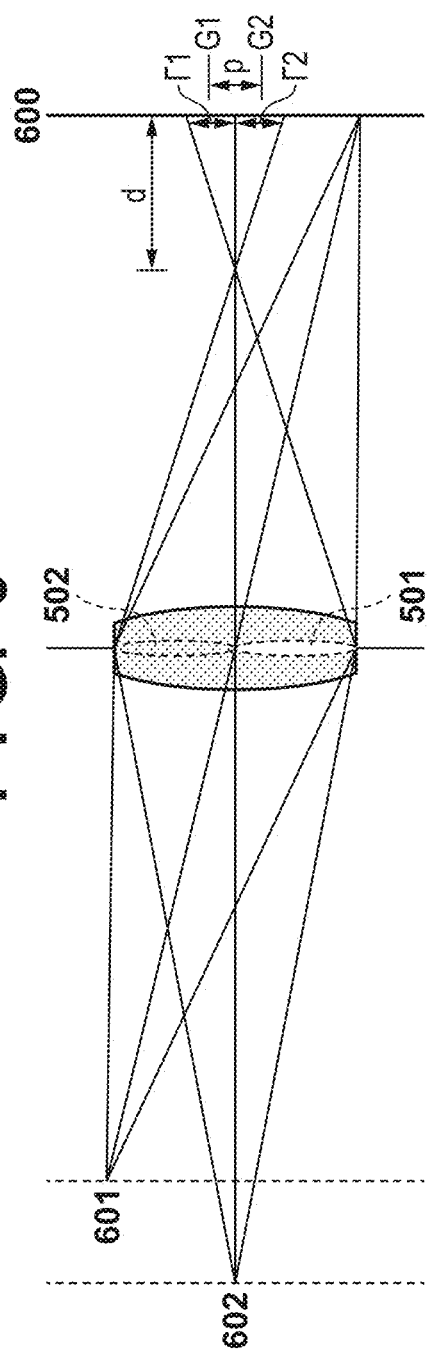
FIG. 6 is a schematic diagram of a relationship between a defocus amount based on a first focus detection signal and a second focus detection signal and an amount of image displacement between the first focus detection signal and the second focus detection signal.

FIG. 6 is a schematic diagram of a relationship between a defocus amount based on the first focus detection signal and the second focus detection signal and an amount of image displacement between the first focus detection signal and the second focus detection signal. The image sensor 122 is arranged on the image capturing surface 600. Similarly to FIG. 4 and FIG. 5, the pupil surface of the image sensor 122 is divided into two, namely into the first pupil partial area 501 and the second pupil partial area 502.

Regarding a defocus amount d, provided that the distance from the position of subject image formation to the image capturing surface is a magnitude |d|, a front focus state where the position of subject image formation is on the side closer to a subject relative to the image capturing surface is defined using a negative sign (d<0). On the other hand, a rear focus state where the position of subject image formation is on the side opposite to a subject relative to the image capturing surface is defined using a positive sign (d>0). In an in-focus state where the position of subject image formation is on the image capturing surface (in-focus position), d=0. FIG. 6 shows an example in which a subject 601 is in the in-focus state (d=0) whereas a subject 602 is in the front focus state (d<0). The front focus state (d<0) and the rear focus state (d>0) are collectively considered as a defocus state (|d|>0).

In the front focus state (d<0), among light beams from the subject 602, light beams that have passed through the first pupil partial area 501 (second pupil partial area 502) are concentrated once, and then disperse over a width of Γ1 (Γ2) around the center-of-mass position G1 (G2) of light beams, thereby forming a blurry image on the image capturing surface 600. Light of the blurry image is received by the first focus detection pixel 201 (second focus detection pixel 202) that composes each pixel arranged in the image sensor 122, and the first focus detection signal (second focus detection signal) is generated. Therefore, the first focus detection signal (second focus detection signal) is recorded as a subject image of the subject 602 that has been blurred over a width of Γ1 (Γ2) at the center-of-mass position G1 (G2) on the image capturing surface 600. The blur width Γ1 (Γ2) of the subject image increases roughly in proportion to an increase in the magnitude |d| of the defocus amount d. Similarly, a magnitude |p| of an amount of image displacement p between the subject images of the first focus detection signal and the second focus detection signal (=the difference G1−G2 between the center-of-mass positions of light beams) also increases roughly in proportion to an increase in the magnitude |d| of the defocus amount d. The same goes for the rear focus state (d>0), although in this case the direction of image displacement between the subject images of the first focus detection signal and the second focus detection signal is opposite to the front focus state.

The magnitude of the amount of image displacement between the first focus detection signal and the second focus detection signal increases with an increase in the magnitude of the defocus amount of the first focus detection signal and the second focus detection signal, or the captured image signal obtained by adding the first focus detection signal and the second focus detection signal. Therefore, in the present embodiment, the phase detection AF unit 129 makes use of the relationship in which the magnitude of the amount of image displacement between the first focus detection signal and the second focus detection signal increases with an increase in the magnitude of the defocus amount of the captured image signal, and converts the amount of image displacement into a detected defocus amount with use of a conversion coefficient calculated based on a base-line length.

Flow of Shooting Processing

Figure 7:
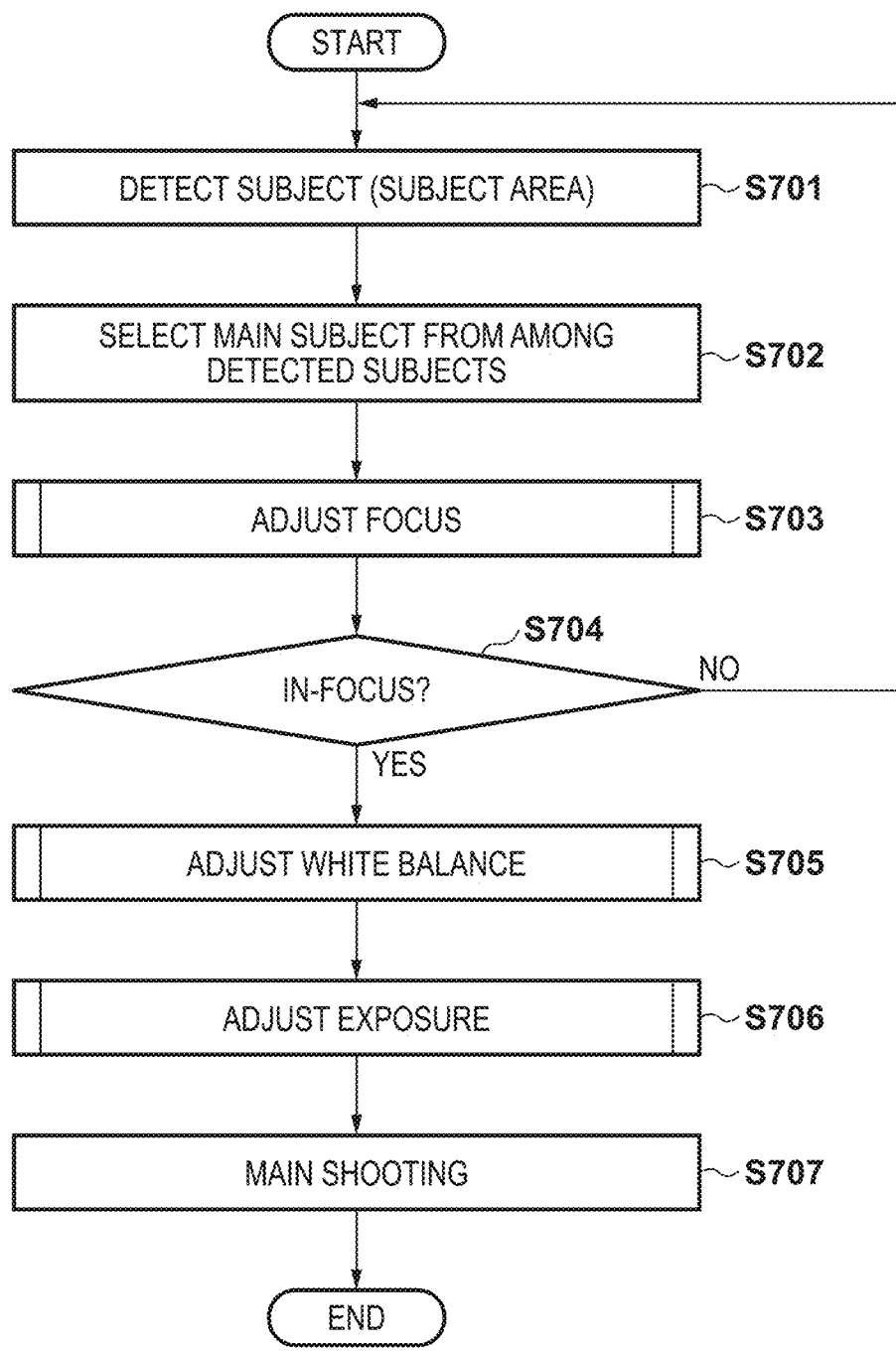
FIG. 7 is a flowchart of shooting processing.

FIG. 7 is a flowchart of shooting processing. This shooting processing is executed by the camera MPU 125. Also, the lens MPU 117 shares a part of the processing where necessary.

In step S701, the camera MPU 125 executes subject detection by controlling the subject detection unit 132 based on captured image data generated by the image sensor 122 (e.g., data obtained through live-view shooting). The following describes the types and states (attributes) of subjects detected by the subject detection unit 132, as well as the positions and sizes (subject areas) of the subjects, according to the present embodiment.

Figure 8:
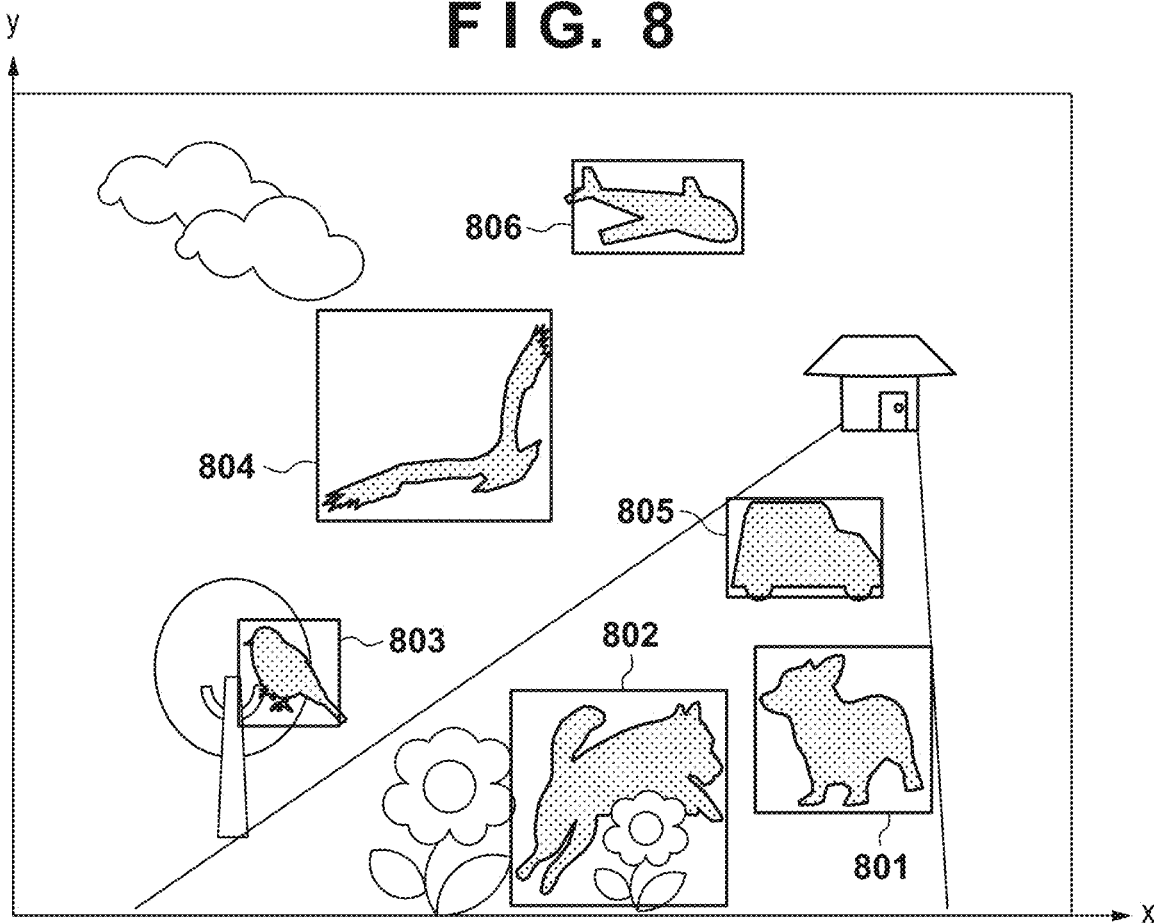
FIG. 8 is a schematic diagram of a relationship between subjects (detection targets) and detection areas (subject areas).

FIG. 8 is a schematic diagram of a relationship between subjects (detection targets) and detection areas (subject areas). In FIG. 8, subject areas 801 to 806 are subject areas that have been detected by the subject detection unit 132. As can be understood from FIG. 8, a subject area is an area that partially includes a subject (a dog, a bird, etc.) to be detected. In other words, a subject area also includes an area that does not include a subject to be detected (e.g., a background area). That is to say, in the present embodiment, such phrases as "subject detection" and "detect a subject" do not strictly refer to detection of an area that includes a specific subject, but refer to detection of an area that partially includes a subject to be detected.

The attributes (types and states) of respective subjects, as well as the positions and sizes of subject areas, are represented as in Table 1. The subject detection unit 132 detects the attributes and subject areas of subjects based on a signal for subject detection generated by the image processing circuit 124.

TABLE 1

| | Detection Attribute | | Subject Area | |
|---|---|---|---|---|
| | Type | State | Position | Size |
| 801 | Dog | Stationary | (x1, y1) | (w1, h1) |
| 802 | Dog | Running | (x2, y2) | (w2, h2) |
| 803 | Bird | Stationary | (x3, y3) | (w3, h3) |
| 804 | Bird | Flying | (x4, y4) | (w4, h4) |
| 805 | Car | Travelling | (x5, y5) | (w5, h5) |
| 806 | Airplane | Flying | (x6, y6) | (w6, h6) |

In an example of FIG. 8, the attributes and subject areas related to a plurality of subjects are detected from one signal for subject detection. However, the subject detection unit 132 may detect only the attribute and subject area of a subject that has the highest possibility of being a main subject. Furthermore, although it is assumed here that an attribute includes a type and a state, no limitation is intended by this; an attribute may include only one of a type and a state, or may include another index. Furthermore, although it is assumed in the present embodiment that an entire body of a dog or a bird, or an entirety of a car or an airplane, is detected as a subject type, it is permissible to detect a specific location (e.g., a face or pupils) of a dog or a bird, and a specific portion (e.g., a driver or a driver's head) of a car or an airplane.

In the following description, a "detection attribute" means an attribute of a target of detection by the subject detection unit 132. For example, when a ship is not a target of detection by the subject detection unit 132, a ship, which is a subject type, is an attribute but is not a detection attribute. Thus, strictly speaking, a "detection attribute" and an "attribute" are not the same. However, in the following description, as there is no need to take into consideration an attribute other than a detection target as a general rule, a "detection attribute" and an "attribute" are not strictly distinguished from each other, and a "detection attribute" may simply be referred to as an "attribute", unless it is specifically mentioned otherwise.

Returning to FIG. 7, in step S702, the camera MPU 125 selects a main subject from among the subjects detected in step S701. The main subject is selected (determined) in accordance with preset priority ranks of detection attributes (types, states) and subject areas (positions, sizes). For example, a higher priority rank can be set for an attribute with a higher shooting frequency. For example, with regard to types, priority ranks descend in the order of a person, a dog, a bird, a car, and an airplane, whereas with regard to states, priority ranks descend in the order of running, flying, and stationary. Furthermore, with regard to positions, a higher priority rank is set for the center image height, whereas with regard to sizes, a higher priority rank is set for a larger size.

In step S703, the camera MPU 125 executes focus adjustment (focus control) by controlling the phase detection AF unit 129. The details of focus adjustment will be described later.

In step S704, the camera MPU 125 makes a determination about focus. When it is determined that focus has been achieved, processing proceeds to step S705; when it is determined that focus has not been achieved, processing returns to step S701.

In step S705, the camera MPU 125 executes white balance adjustment (white balance control) by controlling the white balance adjustment unit 131. The details of white balance adjustment will be described later.

In step S706, the camera MPU 125 executes exposure adjustment (exposure control) by controlling the AE unit 130. The details of exposure adjustment will be described later.

In step S707, the camera MPU 125 executes main shooting (shooting of an image for recording).

Details of Focus Adjustment Processing in Step S703

Figure 9:
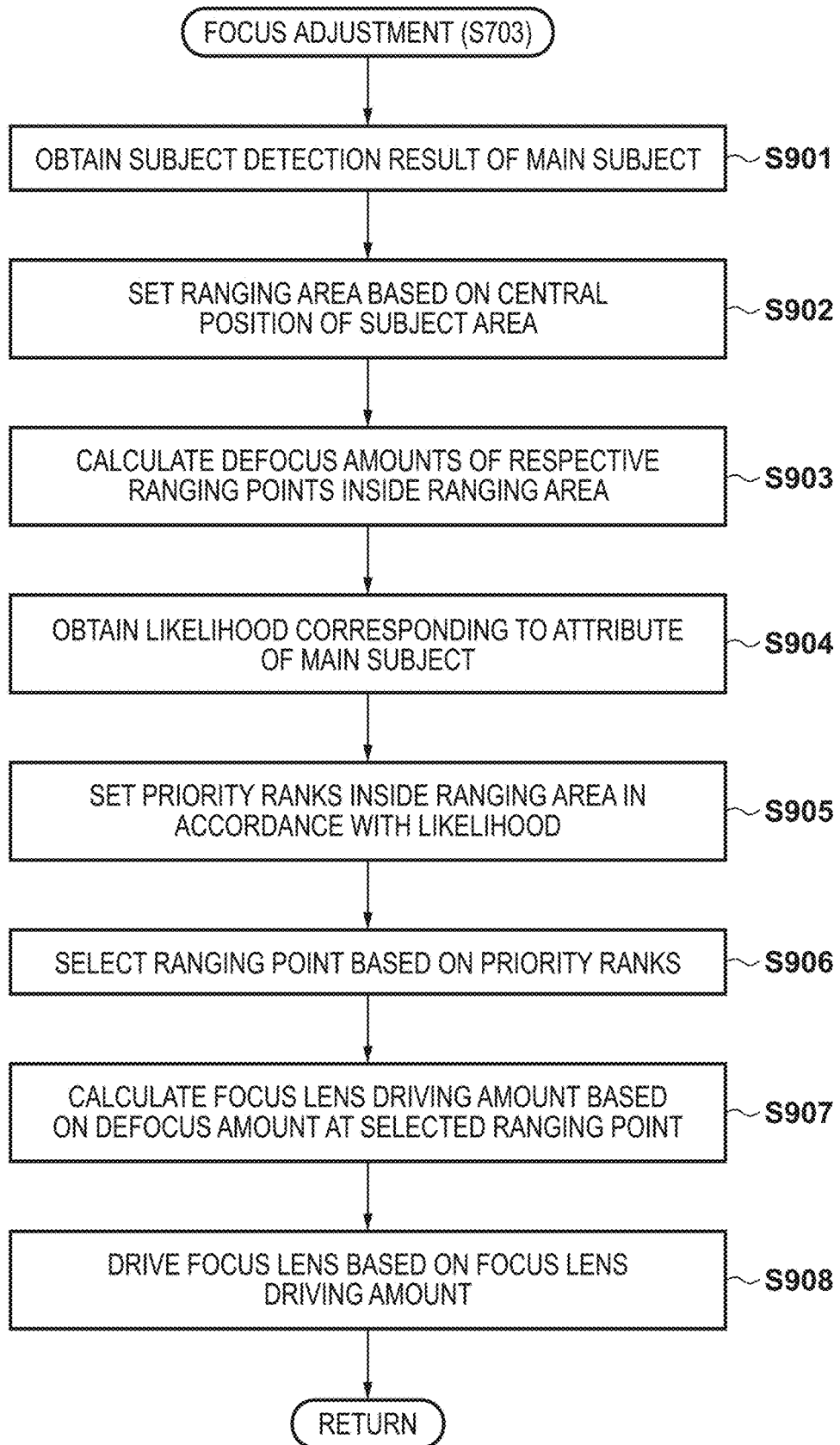
FIG. 9 is a flowchart showing the details of focus adjustment processing in step S703 of FIG. 7.

FIG. 9 is a flowchart showing the details of focus adjustment processing in step S703 of FIG. 7. Note that the processing of FIG. 9 is executed by the phase detection AF unit 129 controlled by the camera MPU 125.

In step S901, the phase detection AF unit 129 obtains the subject detection results (detection attribute and subject area) of the main subject detected in steps S701 and S702.

In step S902, the phase detection AF unit 129 sets a ranging area based on the central position of the subject area obtained in step S901. By setting the ranging area based on the central position, the results of ranging near the main subject can be obtained at high densities even when the number of ranging points that can be simultaneously calculated is limited. Then, by selecting the optimal result of ranging from among the obtained results of ranging, the main subject can be brought into focus appropriately.

In step S903, the phase detection AF unit 129 calculates defocus amounts of respective ranging points inside the ranging area set in step S902.

In step S904, the phase detection AF unit 129 (likelihood setting unit) obtains, from the camera MPU 125 (likelihood storage unit), a likelihood corresponding to the detection attribute obtained in step S901. Note, although it is assumed here that the likelihood is stored in the camera MPU 125, the present embodiment is not limited in this way. For example, the phase detection AF unit 129 may obtain the likelihood stored in a cloud and the like via communication.

Figure 10:
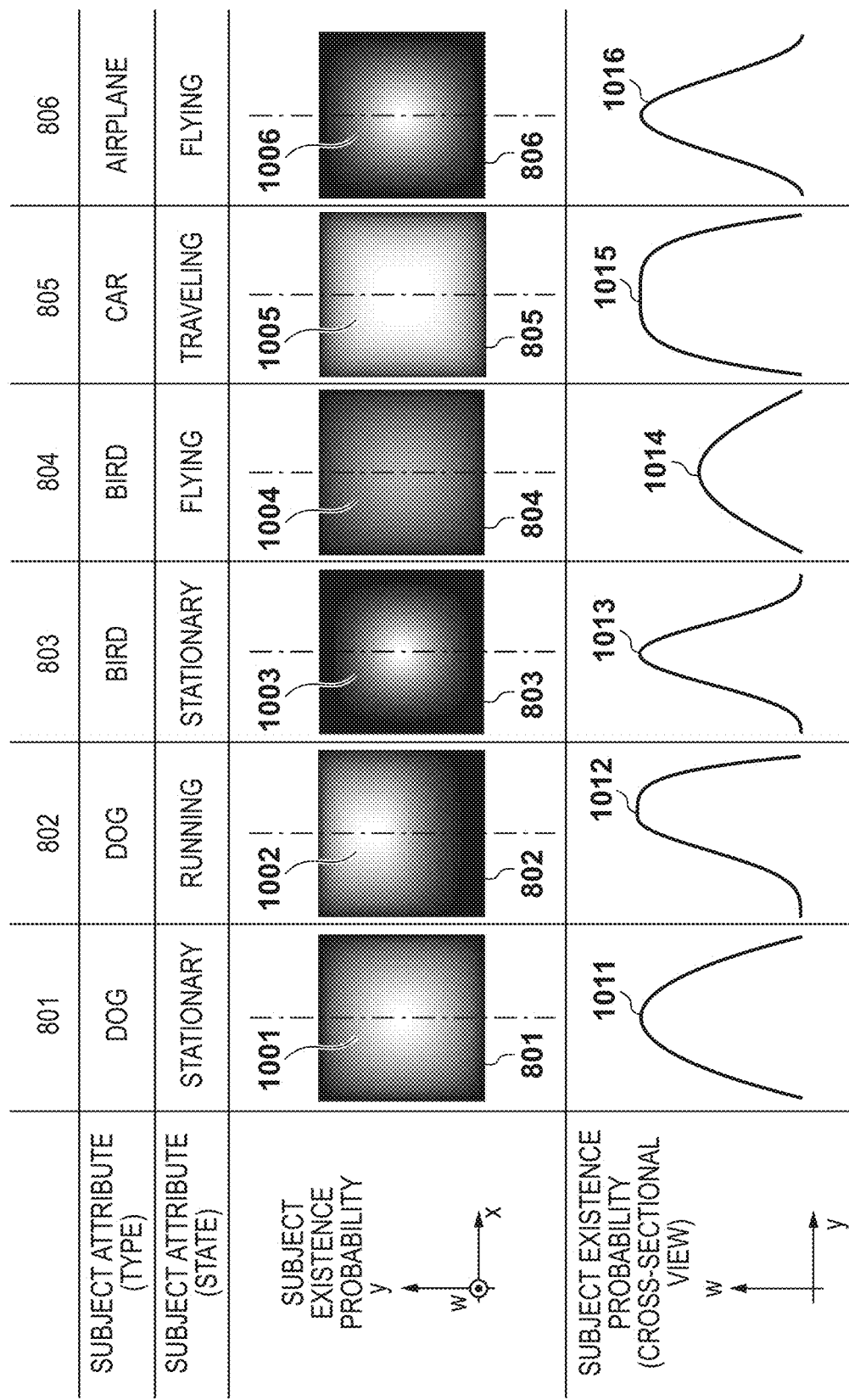
FIG. 10 is a schematic diagram of a relationship among likelihoods corresponding to detection attributes according to a first embodiment.

Likelihoods corresponding to detection attributes are now described with reference to FIG. 10. FIG. 10 is a schematic diagram of a relationship among likelihoods corresponding to detection attributes. Reference signs 1001 to 1006 of FIG. 10 indicate likelihoods of respective detection attributes (types, states) corresponding to the subject areas 801 to 806 of FIG. 8. Reference signs 1011 to 1016 of FIG. 10 indicate likelihoods at dash-and-dot lines of the likelihoods 1001 to 1006 of FIG. 10.

The likelihoods in FIG. 10 represent the probabilities of existence of a subject of a detection attribute (detection target) at respective sets of coordinates inside the subject area of the main subject detected in steps S701 and S702. In other words, in the present embodiment, a likelihood denotes the distribution of existence probabilities of a subject in a subject area.

A description is now given of a specific example of a method of calculating the distribution of existence probabilities. The calculation is performed in advance by, for example, a PC (personal computer). First, for each detection attribute, the PC obtains a plurality of captured images that correspond to a plurality of scenes. Then, with respect to a subject area in each captured image, the PC identifies an area in which a subject to be detected exists and an area in which the subject to be detected does not exist. Then, with respect to each set of coordinates inside the subject area, the PC calculates the percentage of the number of scenes in which the subject to be detected exist in the total number of scenes. In this way, the distribution of existence probabilities of a subject can be statistically calculated. Note that the subject area does not necessarily have a constant size. Therefore, in calculating the distribution of existence probabilities, for example, the size of the subject area in each captured image may be normalized to a predetermined size.

The distribution of existence probabilities that has been calculated beforehand in the foregoing manner is stored in the camera MPU 125, and the phase detection AF unit 129 can obtain and use this distribution of existence probabilities where necessary. Also, where necessary, the distribution of existence probabilities that has been calculated separately may be obtained from the PC, cloud, and the like and then stored into the camera MPU 125, or the distribution of existence probabilities that has been stored beforehand may be updated (changed). Furthermore, the distribution of probabilities stored in the cloud may be obtained from the cloud via communication each time the attribute of a detected subject changes. Moreover, although it is assumed in the present embodiment that a subject area has a quadrilateral shape, no limitation is intended by this; a subject area may have, for example, a circular or trapezoidal shape.

A description is now given of examples of the characteristics of probability distributions corresponding to the attributes of subjects. A likelihood 1001 of FIG. 10 shows that the probability is higher toward the center of a subject area, and lower toward the periphery of the subject area. This is because, while a dog can take a variety of postures when stationary, the center represents the dog in most of the cases, whereas the periphery represents a background or an obstacle in some cases.

On the other hand, a likelihood 1002 of FIG. 10 shows that the subject probability is higher in the upper side of a subject area, and lower in the lower side of the subject area. This is because, with regard to a running dog, unlike a stationary dog, the vicinity of the legs is often a background, and furthermore, the lower side does not represent the dog in many cases because the positions of the legs vary depending on the timing of signal obtainment.

Also, a likelihood 1003 of FIG. 10 shows that the degree at which the subject probability becomes low at the periphery of a subject area is high compared to the likelihood 1001. This is because a dog and a bird, even when in the same stationary state, have different shapes, and in the case of a bird, the periphery often includes a background.

A likelihood 1004 of FIG. 10 shows that the probability at the center of a subject area is low compared to other detection attributes, and furthermore, the probability is lower toward the periphery. While flying, a bird is often flapping its wings; when a bird is flapping its wings, it is often the case that the center of a detection area is a background depending on the state of the wings. Therefore, the probability is low also at the center of the subject area.

A likelihood 1005 of FIG. 10 shows that the probability at the periphery of a subject area is high compared to other detection attributes. As a car often has a near-quadrilateral shape, the inside of the subject area substantially represents the car and does not often include a background and the like. Therefore, the subject probability is high even at the periphery of a detection area.

A likelihood 1006 of FIG. 10 shows that the degree at which the probability becomes low at the periphery of a subject area is high. An airplane has a complex shape because wings and the like are attached to its main body. Therefore, the subject area easily includes a background and the like at its periphery, and the degree at which the probability becomes low at the periphery of the subject area is high.

As described above, the state of the distribution of existence probabilities of a subject inside a subject area varies depending on a detection attribute (type, state). Therefore, the image capturing apparatus 10 holds a plurality of distributions of existence probabilities that have been determined in advance for respective attributes; based on the distribution corresponding to the attribute of a subject that has been actually detected, the distribution of existence probabilities of the subject included in a subject area can be obtained. In this way, a ranging result appropriate for the subject can be selected.

Returning to FIG. 9, in step S905, the phase detection AF unit 129 (area setting unit) sets priority ranks inside the ranging area in accordance with the likelihood (distribution of existence probabilities) obtained in step S904.

With reference to FIG. 11, the following describes the setting of priority ranks inside the ranging area in the present embodiment. FIG. 11 is a schematic explanatory diagram of the setting of priority ranks inside the ranging area. Reference signs 1101 to 1103 of FIG. 11 indicate a first area to a third area inside the ranging area, which have been set with respect to the subject area 801 of FIG. 8 based on the probability distribution obtained in step S904 of FIG. 9. Reference signs 1111 to 1113 of FIG. 11 indicate a first area to a third area within the ranging area that have been set, with respect to the subject area 802 of FIG. 8, based on the probability distribution obtained in step S904 of FIG. 9. Reference signs 1100_*n* and 1110_*n* of FIG. 11 indicate ranging points inside the ranging area set in step S902. Therefore, based on data corresponding to the first area among captured image data, a plurality of defocus amounts corresponding to a plurality of positions in the first area (a first plurality of defocus amounts) are calculated. Similarly, based on data corresponding to the second area among the captured image data, a plurality of defocus amounts corresponding to a plurality of positions in the second area (a second plurality of defocus amounts) are calculated. Furthermore, based on data corresponding to the third area among the captured image data, a plurality of defocus amounts corresponding to a plurality of positions in the third area (a third plurality of defocus amounts) are calculated.

The phase detection AF unit 129 identifies an area in which the existence probability is equal to or higher than X1% (equal to or higher than a probability threshold) as the first area, an area which is inside the subject area and in which the existence probability is lower than X1% (lower than the probability threshold) as the second area, and a ranging area outside the subject area as the third area. Then, the phase detection AF unit 129 sets priority ranks that descend in order from the first area.

Note, although the first area and the second area are set inside the subject area using a threshold of X1% in the present embodiment, no limitation is intended by this. Furthermore, although the priority ranks corresponding to three levels, namely the first area to the third area are set inside the ranging area in the present embodiment, no limitation is intended by this; priority ranks corresponding to two levels, or four levels or more, may be set.

Returning to FIG. 9, in step S906, the phase detection AF unit 129 selects a ranging point in accordance with the priority ranks set in step S905. To select the ranging point, the phase detection AF unit 129 first determines whether ranging points inside the first area, which has the highest priority rank, include ranging points with defocus amounts that have reliability degrees equal to or higher than a threshold (equal to or higher than a reliability degree threshold). If such ranging points are included, the phase detection AF unit 129 selects a ranging point with a defocus amount that has the minimum distance among the defocus amounts that have reliability degrees equal to or higher than the threshold. In other words, the phase detection AF unit 129 selects, from among a plurality of defocus amounts corresponding to a plurality of positions in the first area (the first plurality of defocus amounts), a first defocus amount that has a reliability degree equal to or higher than the reliability degree threshold (e.g., a defocus amount that has the minimum distance).

On the other hand, when a defocus amount that has a reliability degree equal to or higher than the threshold does not exist inside the first area, the phase detection AF unit 129 determines whether ranging points in the second area, which has the second highest priority rank, include ranging points with defocus amounts that have reliability degrees equal to or higher than the threshold. If such ranging points are included, the phase detection AF unit 129 selects a ranging point with a defocus amount that has the minimum distance among the defocus amounts that have reliability degrees equal to or higher than the threshold. In other words, the phase detection AF unit 129 selects, from among a plurality of defocus amounts corresponding to a plurality of positions in the second area (the second plurality of defocus amounts), a second defocus amount that has a reliability degree equal to or higher than the reliability degree threshold (e.g., a defocus amount that has the minimum distance).

When a defocus amount that has a reliability degree equal to or higher than the threshold does not exist inside the second area, either, the phase detection AF unit 129 selects, from among ranging points in the third area, a ranging point with a defocus amount that has the minimum distance among defocus amounts that have reliability degrees equal to or higher than the threshold. In other words, the phase detection AF unit 129 selects, from among a plurality of defocus amounts corresponding to a plurality of positions in the third area (the third plurality of defocus amounts), a third defocus amount that has a reliability degree equal to or higher than the reliability degree threshold (e.g., a defocus amount that has the minimum distance).

In this way, by selecting a ranging point from an area with a high priority rank, a ranging point in an area with a high probability of existence of a subject to be detected can be selected. Therefore, even when a subject area includes an area in which a subject to be detected does not exist, appropriate ranging can be performed with respect to the subject to be detected.

In step S907, the phase detection AF unit 129 calculates a focus lens driving amount based on the defocus amount at the ranging point selected in step S906.

In step S908, the phase detection AF unit 129 performs control for driving the focus lens 104 based on the focus lens driving amount calculated in step S907.

Details of White Balance Adjustment Processing in Step S705

Figure 12:
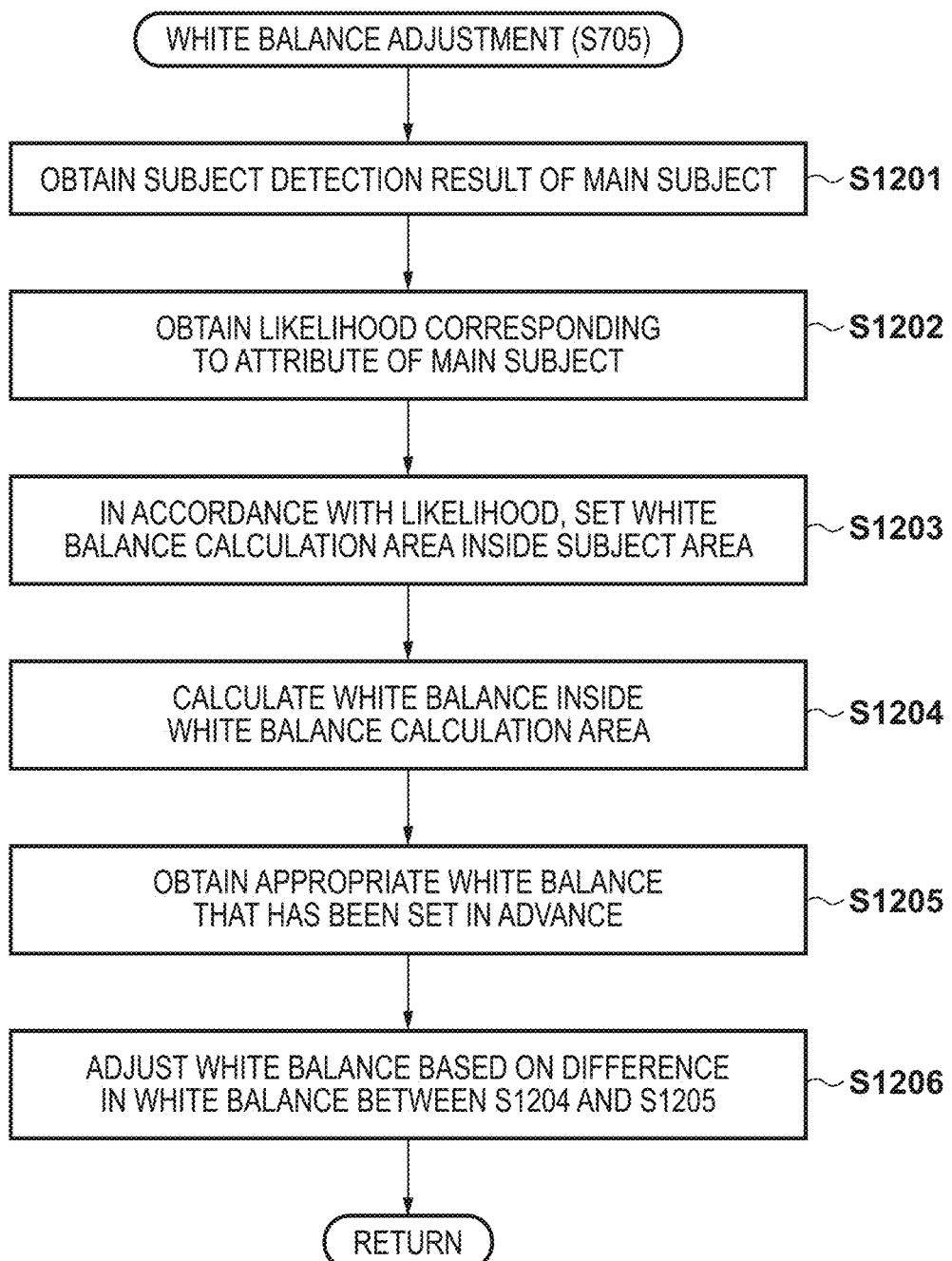
FIG. 12 is a flowchart showing the details of white balance adjustment processing in step S705 of FIG. 7.

FIG. 12 is a flowchart showing the details of white balance adjustment processing in step S705 of FIG. 7. Note that the processing of FIG. 12 is executed by the white balance adjustment unit 131 controlled by the camera MPU 125.

In step S1201, the white balance adjustment unit 131 obtains the subject detection results (detection attribute and subject area) of the main subject detected in steps S701 and S702.

In step S1202, the white balance adjustment unit 131 (likelihood setting unit) obtains, from the camera MPU 125 (likelihood storage unit), a likelihood (distribution of existence probabilities) corresponding to the detection attribute obtained in step S1201. Note, although it is assumed here that the likelihood is stored in the camera MPU 125, the present embodiment is not limited in this way. For example, the white balance adjustment unit 131 may obtain the likelihood stored in a cloud and the like via communication.

In step S1203, the white balance adjustment unit 131 (area setting unit) identifies a first area, which will be described below, in accordance with the likelihood obtained in step S1201, and sets the first area as a white balance calculation area.

Figure 13:
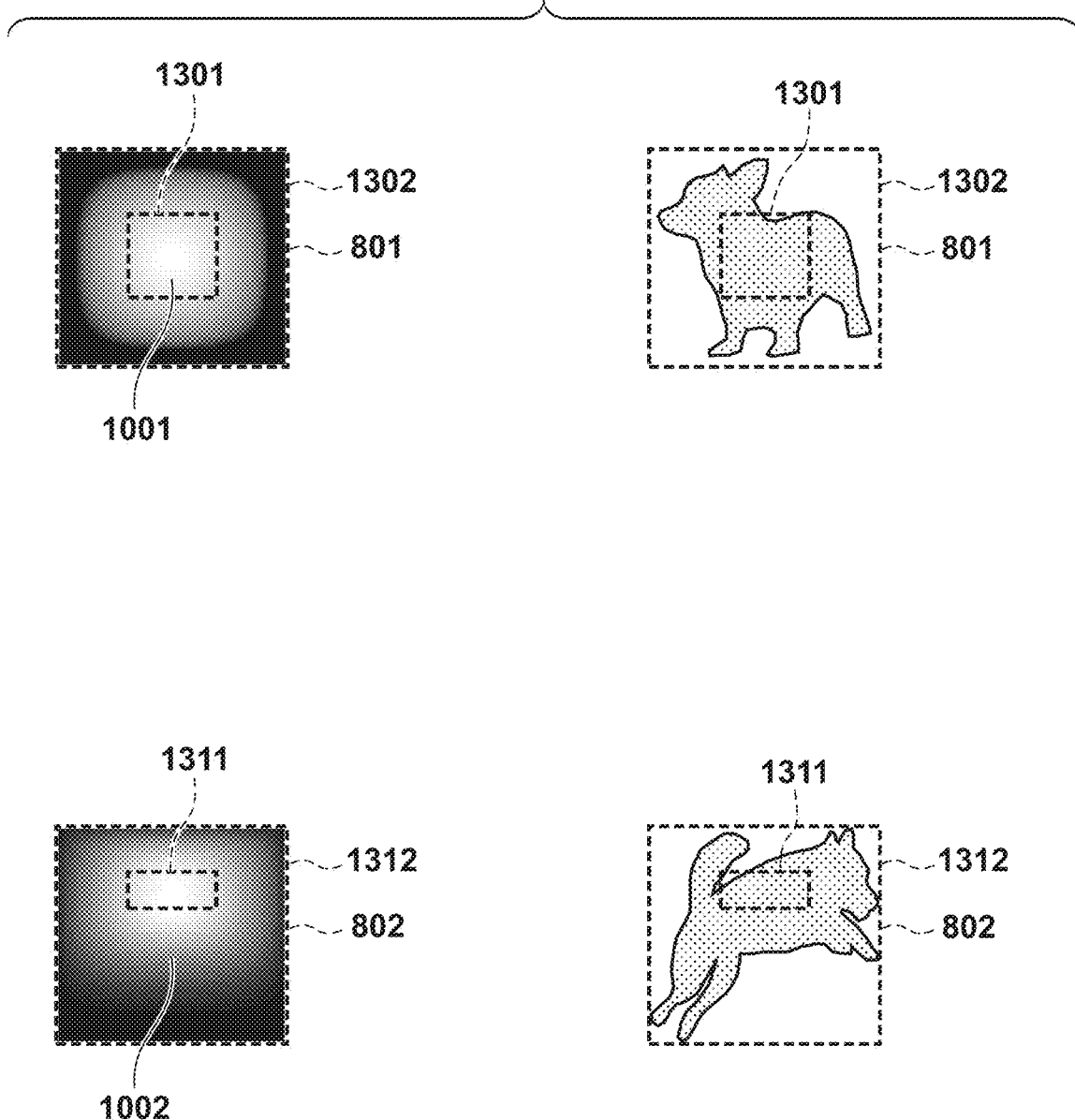
FIG. 13 is a schematic explanatory diagram of the setting of a white balance calculation area.

With reference to FIG. 13, the following describes the setting of the white balance calculation area in the present embodiment. FIG. 13 is a schematic explanatory diagram of the setting of the white balance calculation area. Reference signs 1301 and 1302 of FIG. 13 indicate a first area and a second area inside the subject area, which are set with respect to the subject area 801 of FIG. 8 based on the probability distribution obtained in step S1202 of FIG. 12. Reference signs 1311 and 1312 of FIG. 13 indicate a first area and a second area inside the subject area, which are set with respect to the subject area 802 of FIG. 8 based on the probability distribution obtained in step S1202 of FIG. 12.

The white balance adjustment unit 131 identifies an area in which the existence probability is equal to or higher than X1% (equal to or higher than a probability threshold) as the first area, and identifies an area in which the existence probability is lower than X1% (lower than the probability threshold) as the second area.

Although the first area and the second area are set inside the subject area using a threshold of X1% in the present embodiment, no limitation is intended by this. Furthermore, although the subject area is divided into two levels, namely the first area and the second area in the present embodiment, no limitation is intended by this; the subject area may be divided into three levels or more.

Moreover, although the first area is set as the white balance calculation area in the present embodiment, the entirety of the subject area may be set as the white balance calculation area with weights given to the first area and the second area, respectively, so that the first area is prioritized.

Returning to FIG. 12, in step S1204, the white balance adjustment unit 131 calculates white balance inside the white balance calculation area set in step S1203.

In step S1205, the white balance adjustment unit 131 obtains appropriate white balance that has been set in advance.

In step S1206, the white balance adjustment unit 131 computes the difference between the white balance calculated in step S1204 and the white balance obtained in step S1205, and adjusts white balance with respect to the captured image data (captured image signal).

Details of Exposure Adjustment Processing in Step S706

Figure 14:
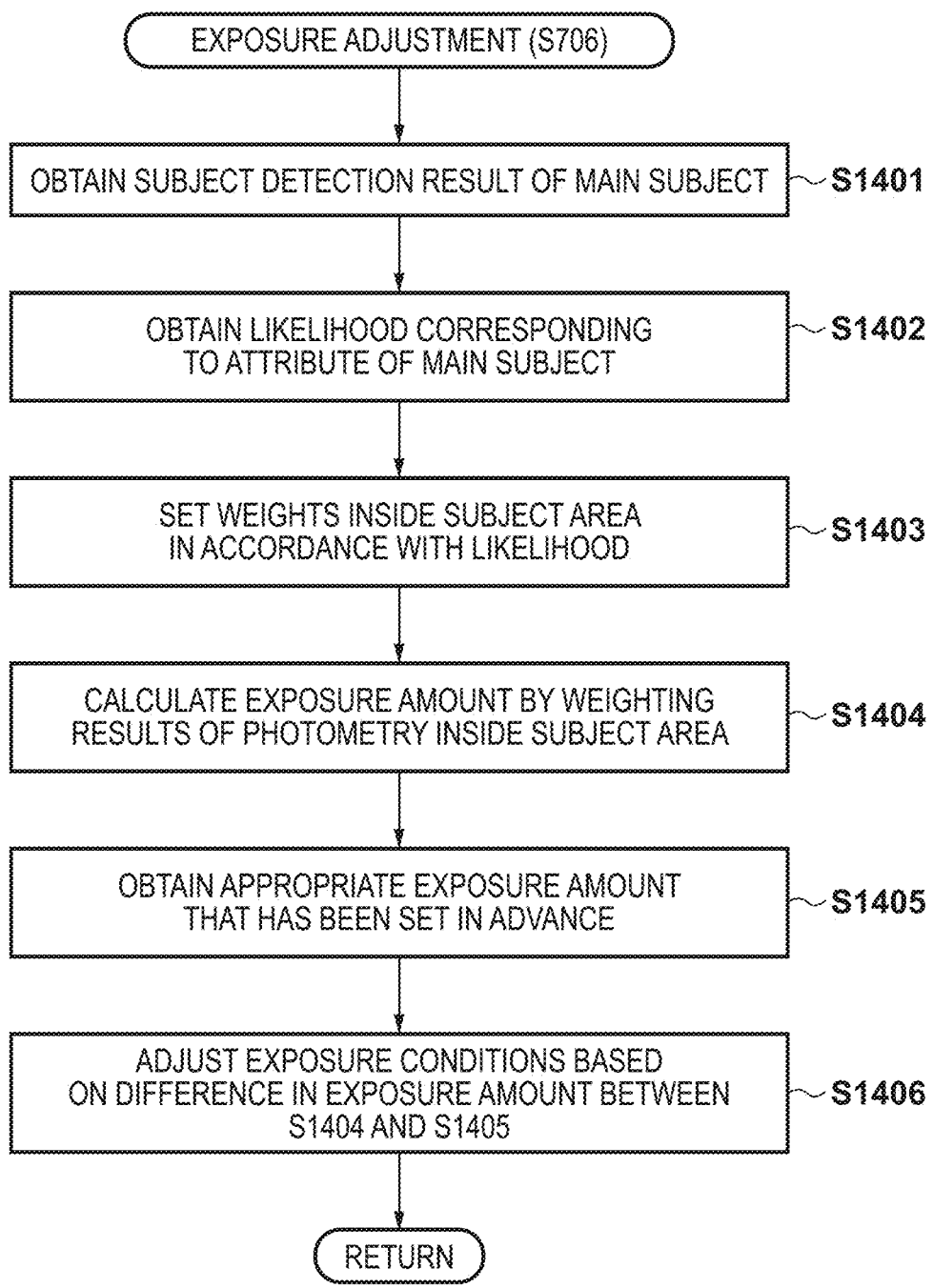
FIG. 14 is a flowchart showing the details of exposure adjustment processing in step S706 of FIG. 7.

FIG. 14 is a flowchart showing the details of exposure adjustment processing in step S706 of FIG. 7. Note that the operations of FIG. 14 are executed by the AE unit 130 controlled by the camera MPU 125.

In step S1401, the AE unit 130 obtains the subject detection results (detection attribute and subject area) of the main subject detected in steps S701 and S702.

In step S1402, the AE unit 130 (likelihood setting unit) obtains, from the camera MPU 125 (likelihood storage unit), a likelihood (distribution of existence probabilities) corresponding to the detection attribute obtained in step S1401. Note, although it is assumed here that the likelihood is stored in the camera MPU 125, the present embodiment is not limited in this way. For example, the AE unit 130 may obtain the likelihood stored in a cloud and the like via communication.

In step S1403, the AE unit 130 (area setting unit) sets weights inside the subject area, which are used in calculation of an exposure amount, in accordance with the likelihood obtained in step S1402.

With reference to FIG. 15, the following describes the setting of weights inside the subject area, which are used in calculation of an exposure amount, in the present embodiment. FIG. 15 is a schematic explanatory diagram of the setting of weights inside the subject area, which are used in calculation of an exposure amount.

As shown in FIG. 15, in order to set weights inside the subject area, which are used in calculation of an exposure amount, the AE unit 130 sets the probability distribution obtained in step S1402 of FIG. 14, as is, as weighting coefficients.

Returning to FIG. 14, in step S1404, the AE unit 130 calculates an exposure amount by weighting the results of photometry inside the subject area with use of the weighting coefficients inside the subject area, which were set in step S1403. Therefore, here, exposure adjustment (exposure control) includes computation that uses the existence probabilities of the subject at respective positions in the subject area as weighting coefficients for data corresponding to respective positions among the captured image data.

In step S1405, the AE unit 130 obtains an appropriate exposure amount that has been set in advance.

In step S1406, the AE unit 130 computes the difference between the exposure amount calculated in step S1404 and the exposure amount obtained in step S1405, and adjusts exposure conditions at the time of shooting.

As described above, according to the first embodiment, the image capturing apparatus 10 detects a subject area that partially includes a subject to be detected based on captured image data. Then, the image capturing apparatus 10 performs shooting control based on data corresponding to the subject area among the captured image data, and on the distribution of existence probabilities of the subject in the subject area. At this time, the image capturing apparatus 10 performs shooting control so that the contribution of data corresponding to a position with a first existence probability is larger than the contribution of data corresponding to a position with a second existence probability that is lower than the first existence probability. Specific examples of such shooting control include focus adjustment (focus control) shown in FIG. 9, white balance adjustment (white balance control) shown in FIG. 12, exposure adjustment (exposure control) shown in FIG. 14, and so forth; however, shooting control of the present embodiment is not limited to these specific examples.

Due to the foregoing configuration, the present embodiment can improve the accuracy of shooting control based on a subject detection area that partially includes a subject to be detected.

Note that the foregoing has described a configuration in which the image capturing apparatus 10 regards a plurality of attributes (a dog, a bird, and the like) as detection targets, and obtains a likelihood (a distribution of existence probabilities of a subject) based on the attribute of a subject that has been actually detected. However, the image capturing apparatus 10 may regard only a specific attribute (e.g., a stationary dog) as a detection target. In this case, with regard to a likelihood as well, it is sufficient for the image capturing apparatus 10 to use a specific likelihood that has been set in advance.

Second Embodiment

A second embodiment will be described in relation to a configuration that differs from the first embodiment in terms of a likelihood corresponding to a detection attribute in focus adjustment processing. Note that in the second embodiment, a basic configuration of the image capturing apparatus 10 is similar to that of the first embodiment (see FIG. 1). The following mainly describes differences from the first embodiment.

A likelihood of the first embodiment is the distribution of existence probabilities of a subject. On the other hand, a likelihood of the second embodiment is the probability that a subject to be detected is included in a predetermined distance range from the center of a subject area (subject inclusion probability). In this context, "a subject to be detected is included in a predetermined distance range from the center of a subject area" means that a subject to be detected exists in at least a part of an area inside a predetermined distance range from the center of a subject area".

The larger the first area, which is given the highest priority in focus adjustment (in the case of the first embodiment, for example, reference sign 1101 of FIG. 11), the higher the probability that it includes a subject to be detected, and at the same time, the higher the probability that it also includes a subject other than the subject to be detected. Therefore, in one embodiment, the first area is set to have the necessary minimum range (the smallest range possible).

In the present embodiment, by setting the first area based on the subject inclusion probability, the first area can be set to have the necessary minimum range, and even if a subject area includes a subject other than a subject to be detected, appropriate ranging can be performed with respect to the subject to be detected.

With reference to FIG. 9, the following describes focus adjustment processing according to the second embodiment. Note that the processing of FIG. 9 is executed by the phase detection AF unit 129 controlled by the camera MPU 125.

In FIG. 9, processing of steps S901 to S904 is similar to the first embodiment. However, the structure of the likelihood obtained in step S904 differs from the first embodiment.

Figure 16:
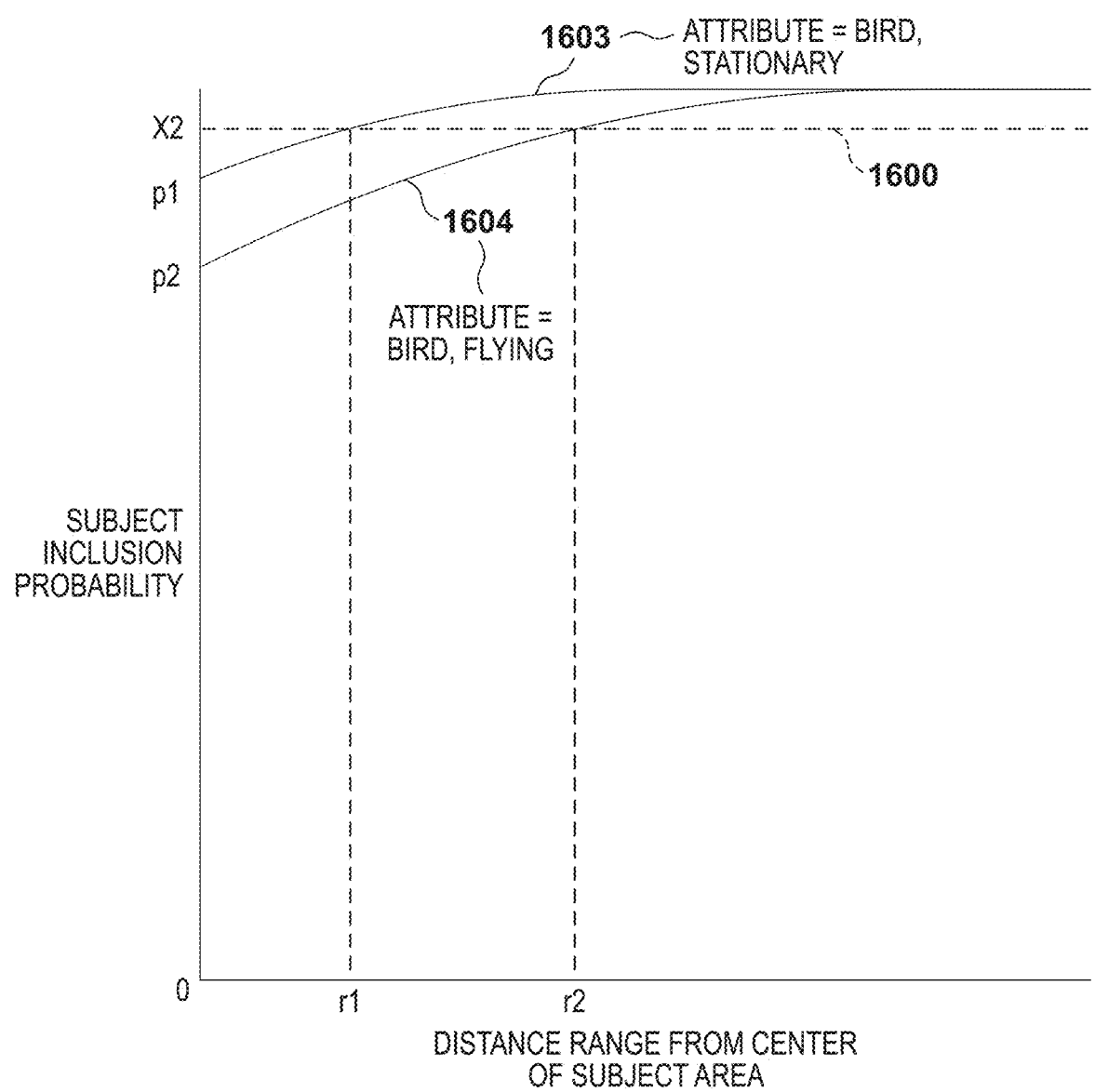
FIG. 16 is a schematic diagram of likelihoods corresponding to detection attributes according to a second embodiment.

FIG. 16 is a schematic diagram of likelihoods corresponding to detection attributes according to the second embodiment. Reference signs 1603 and 1604 of FIG. 16 indicate likelihoods of respective detection attributes (types, states) corresponding to the subject areas 803 and 804 of FIG. 8. Reference sign 1600 of FIG. 16 indicates a threshold (X2% in an example of FIG. 9) that is used in setting a first area (an area to which the highest priority is given) in step S905 of FIG. 9, which will be described later.

The likelihoods in FIG. 16 represent the probabilities that a subject (detection target) is included in a predetermined distance range from the center of the subject area of the main subject detected in steps S701 and S702 (subject inclusion probabilities). A horizontal axis indicates values obtained by normalizing a distance range from the center of the subject area based on the size of the detection area, whereas a vertical axis indicates the probabilities that a subject is included in a distance range from the center of the subject area. As can be understood from FIG. 16, a likelihood of the present embodiment is information that defines a relationship between a distance range from the center of the subject area and the probability that a subject exists at least in a part of an area inside the distance range.

A description is now given of a specific example of a method of calculating a subject inclusion probability. The calculation is performed in advance by, for example, a PC (personal computer). First, for each detection attribute, the PC obtains a plurality of captured images that correspond to a plurality of scenes. Then, with respect to a subject area in each captured image, the PC identifies an area in which a subject to be detected exists and an area in which the subject to be detected does not exist. Then, with respect to each captured image, the PC determines whether a subject (detection target) is included inside a predetermined distance range from the center of the subject area, and calculates the percentage of the number of scenes that include the subject (detection target) in the total number of scenes; in this way, the subject inclusion probability is statistically calculated. Note that the subject area does not necessarily have a constant size. Therefore, in calculating the subject inclusion probability, for example, the size of the subject area in each captured image may be normalized to a predetermined size.

The subject inclusion probability that has been calculated beforehand in the foregoing manner is stored in the camera MPU 125, and the phase detection AF unit 129 can obtain and use this subject inclusion probability where necessary. Also, where necessary, the subject inclusion probability that has been calculated separately may be obtained from the PC, cloud, and the like and then stored into the camera MPU 125, or the subject inclusion probability that has been stored beforehand may be updated (changed). Furthermore, the subject inclusion probability stored in the cloud may be obtained from the cloud via communication each time the attribute of a detected subject changes.

A description is now given of examples of the characteristics of the subject inclusion probabilities corresponding to the detection attributes. As indicated by reference sign 1603 of FIG. 16, in the case of a stationary bird, even in a distance range of 0% from the center of the subject area (the center of the subject area), the subject inclusion probability is high, specifically p1% in the present example. Then, in a position in which a distance range from the center of the subject area is approximately r1%, the subject inclusion probability exceeds a threshold (X2%). This indicates that, with regard to a stationary bird, in most of the cases (X2%), a subject (detection target) is included in an area that covers a distance range of up to approximately r1% from the center of the subject area.

On the other hand, as indicated by reference sign 1604 of FIG. 16, in the case of a flying bird, the subject inclusion probability is relatively low, specifically p2% in the present example, in a distance range of 0% from the center of the subject area (the center of the subject area). Then, in a position in which a distance range from the center of the subject area is approximately r2%, the subject inclusion probability exceeds the threshold (X2%). This indicates that, with regard to a stationary bird, in order to include a subject with a high probability, a distance range is covered up to approximately r2% from the center of the subject area.

As described above, the relationship between a distance range from the center of a subject area and the subject inclusion probability varies depending on a detection attribute (type, state). Therefore, the subject inclusion probabilities (likelihoods) are held for respective detection attributes, and a subject inclusion probability corresponding to a detection attribute is obtained and used; in this way, a ranging result suitable for a subject (detection target) can be selected.

Returning to FIG. 9, in step S905, the phase detection AF unit 129 (area setting unit) sets priority ranks inside a ranging area in accordance with the likelihood (subject inclusion probability) obtained in step S904.

With reference to the upper side of FIG. 11, the following describes the setting of priority ranks inside the ranging area in the present embodiment. Reference signs 1101 to 1103 of FIG. 11 indicate a first area to a third area inside the ranging area, which have been set with respect to the subject area 801 of FIG. 8 based on the subject inclusion probability obtained in step S904 of FIG. 9. That is to say, an area that is included in the subject area and covers a distance range from the center in which the subject inclusion probability reaches the threshold (e.g., X2%) is set as the first area with the highest priority rank (reference numeral 1101). Also, an area that is included in the subject area and corresponds to a distance range from the center in which the subject inclusion probability is higher than the threshold (e.g., X2%) is set as the second area with the second highest priority rank (reference sign 1102). Furthermore, an area that is included in the ranging area and is outside the subject area is set as the third area with the lowest priority rank (reference sign 1103).

Note that in the example of the upper side of FIG. 11, the first area (reference sign 1101) is a square. That is to say, in this example, a distance range related to the subject inclusion probability is defined as a distance range in the horizontal direction (latitude direction). Therefore, for example, when the ratio between the horizontal side and the vertical side of an image is 3:2, even when a distance range shown in FIG. 16 is 0.67 (⅔), the entirety of the image is included inside the distance range with regard to the vertical direction (longitudinal direction). It goes without saying that the distance range need not be restricted in a specific direction, and the first area may be structured so that it has a circular shape.

Furthermore, although the first area and the second area are set inside the subject area using a threshold of X2% in the present embodiment, no limitation is intended by this. Moreover, although the priority ranks corresponding to three levels, namely the first area to the third area are set in the present embodiment, no limitation is intended by this; priority ranks corresponding to two levels, or four levels or more, may be set.

Referring to FIG. 9 again, processing of steps S906 to S908 is similar to that in the first embodiment.

As described above, according to the second embodiment, the image capturing apparatus 10 detects a subject area that partially includes a subject to be detected based on captured image data. Also, based on information that defines a relationship between a distance range from the center of a subject area and the probability that a subject exists in at least a part of an area inside the distance range, the image capturing apparatus 10 identifies a specific distance range in which the probability that the subject exists reaches the threshold. Then, the image capturing apparatus 10 performs shooting control based on data corresponding to the subject area among the captured image data, and on the specific distance range. At this time, the image capturing apparatus 10 performs shooting control so that the contribution of data corresponding to a position inside the specific distance range is larger than the contribution of data corresponding to a position outside the specific distance range. Specific examples of such shooting control include focus adjustment (focus control) shown in FIG. 9; however, shooting control of the present embodiment is not limited to these specific examples. For example, similarly to the first embodiment, shooting control may be white balance adjustment (white balance control) or exposure adjustment (exposure control).

Due to the foregoing configuration, the present embodiment can improve the accuracy of shooting control based on a subject detection area that partially includes a subject to be detected.

Note that the foregoing has described a configuration in which the image capturing apparatus 10 regards a plurality of attributes (a dog, a bird, and the like) as detection targets, and obtains a likelihood (subject inclusion probability) based on the attribute of a subject that has been actually detected. However, the image capturing apparatus 10 may regard only a specific attribute (e.g., a stationary dog) as a detection target. In this case, with regard to a likelihood as well, it is sufficient for the image capturing apparatus 10 to use a specific likelihood that has been set in advance.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-026471, filed Feb. 19, 2020 which is hereby incorporated by reference herein in its entirety.

What is claimed is:

1. An apparatus, comprising:
one or more processors; and
a first memory coupled to the one or more processors storing instructions which, when executed by the one or more processors, cause the one or more processors to function as:
a detection unit configured to, based on captured image data, detect a subject area that partially includes a subject to be detected; and
a control unit configured to perform shooting control based on data corresponding to the subject area among the captured image data, and on a distribution of existence probabilities of the subject in the subject area, the distribution being stored in a second memory, the control unit performing the shooting control so that a contribution of data corresponding to a position with a first existence probability is larger than a contribution of data corresponding to a position with a second existence probability that is lower than the first existence probability.

2. The apparatus according to claim 1,
wherein the subject included in the subject area has an attribute that is one of a plurality of attributes, and
wherein the one or more processors further function as an obtainment unit configured to obtain the distribution of the existence probabilities of the subject in the subject area based on the attribute of the subject.

3. The apparatus according to claim 2, wherein
the obtainment unit obtains the distribution of the existence probabilities of the subject in the subject area based on, among a plurality of distributions of existence probabilities that have been determined in advance for respective attributes, a distribution of existence probabilities corresponding to the attribute of the subject.

4. The apparatus according to claim 2, wherein
the attribute includes at least one of a type and a state.

5. The apparatus according to claim 1, wherein
the control unit:
identifies, in the subject area, a first area with existence probabilities equal to or higher than a probability threshold that is smaller than the first existence probability and larger than the second existence probability; and
performs the shooting control based on first data corresponding to the first area among the data corresponding to the subject area.

6. The apparatus according to claim 1, wherein
the shooting control includes computation that uses existence probabilities of the subject at respective positions in the subject area as weighting coefficients for data corresponding to the respective positions among the captured image data.

7. The apparatus according to claim 1, wherein
the shooting control is focus control, white balance control, or exposure control.

8. The apparatus according to claim 1, wherein
the shooting control is focus control, and
the control unit:
identifies, in the subject area, a first area with existence probabilities equal to or higher than a probability threshold that is smaller than the first existence probability and larger than the second existence probability;
based on first data corresponding to the first area among the data corresponding to the subject area, calculates a first plurality of defocus amounts corresponding to a plurality of positions in the first area;
selects, from among the first plurality of defocus amounts, a first defocus amount that has a reliability degree equal to or higher than a reliability degree threshold; and
performs the focus control based on the first defocus amount.

9. The apparatus according to claim 8, wherein
when the first plurality of defocus amounts do not include a defocus amount that has a reliability degree equal to or higher than the reliability degree threshold, the control unit:
identifies, in the subject area, a second area with existence probabilities lower than the probability threshold;
based on second data corresponding to the second area among the data corresponding to the subject area, calculates a second plurality of defocus amounts corresponding to a plurality of positions in the second area;
selects, from among the second plurality of defocus amounts, a second defocus amount that has a reliability degree equal to or higher than the reliability degree threshold; and
performs the focus control based on the second defocus amount.

10. An image capturing apparatus, comprising:
the apparatus according to claim 1; and
an image sensor configured to generate the captured image data.

11. An apparatus, comprising:
one or more processors; and
a first memory coupled to the one or more processors storing instructions which, when executed by the one or more processors, cause the one or more processors to function as:
a detection unit configured to, based on captured image data, detect a subject area that partially includes a subject to be detected;
an identification unit configured to identify a specific distance range in which a probability that the subject exists reaches a threshold based on information that defines a relationship between a distance range from a center of the subject area and a probability that the subject exists in at least a part of an area inside the distance range, the information being stored in a second memory; and
a control unit configured to perform shooting control based on data corresponding to the subject area among the captured image data, and on the specific distance range, the control unit performing the shooting control so that a contribution of data corresponding to a position inside the specific distance range is larger than a contribution of data corresponding to a position outside the specific distance range.

12. An image capturing apparatus, comprising:
the apparatus according to claim 11; and
an image sensor configured to generate the captured image data.

13. An apparatus, comprising:
one or more processors; and
a first memory coupled to the one or more processors storing instructions which, when executed by the one or more processors, cause the one or more processors to function as:
a detection unit configured to, based on captured image data captured by an image capturing unit, detect a subject area that at least partially includes a subject to be detected; and
a control unit configured to perform shooting control of the image capturing unit based on the captured image data while making area-by-area weights vary in accordance with a subject type with respect to the subject area detected by the detection unit in the captured image data.

14. The apparatus according to claim 13, wherein the one or more processors to further function as:
a storage unit configured to store, respectively, a plurality of types of subjects and data that indicates distributions of existence probabilities of the subjects in subject areas that respectively correspond to the subjects, and
wherein the control unit performs the shooting control while making area-by-area weights vary based on data that indicates the existence probabilities of the subject.

15. The apparatus according to claim 13, further comprising
a second memory storing, respectively, a plurality of types of subjects and data that indicates distributions of existence probabilities of the subjects in subject areas that respectively correspond to the subjects,
wherein based on data that indicates the distribution of existence probabilities corresponding to the detected subject, the control unit performs the shooting control so that, in the detected subject area, a contribution of data corresponding to a position with a first existence probability is larger than a contribution of data corresponding to a position with a second existence probability that is lower than the first existence probability.

16. A method comprising:
based on captured image data, detecting a subject area that partially includes a subject to be detected; and
performing shooting control based on data corresponding to the subject area among the captured image data, and on a distribution of existence probabilities of the subject in the subject area, the distribution being stored in a memory, the shooting control being performed so that a contribution of data corresponding to a position with a first existence probability is larger than a contribution of data corresponding to a position with a second existence probability that is lower than the first existence probability.

17. A method comprising:
based on captured image data, detecting a subject area that partially includes a subject to be detected;
identifying a specific distance range in which a probability that the subject exists reaches a threshold based on information that defines a relationship between a distance range from a center of the subject area and a probability that the subject exists in at least a part of an area inside the distance range, the information being stored in a memory; and
performing shooting control based on data corresponding to the subject area among the captured image data, and on the specific distance range, the shooting control being performed so that a contribution of data corresponding to a position inside the specific distance range is larger than a contribution of data corresponding to a position outside the specific distance range.

18. A non-transitory computer-readable storage medium which stores a program for causing a computer to execute a method comprising:
based on captured image data, detecting a subject area that partially includes a subject to be detected; and
performing shooting control based on data corresponding to the subject area among the captured image data, and on a distribution of existence probabilities of the subject in the subject area, the distribution being stored in a memory, the shooting control being performed so that a contribution of data corresponding to a position with a first existence probability is larger than a contribution of data corresponding to a position with a second existence probability that is lower than the first existence probability.

19. A non-transitory computer-readable storage medium which stores a program for causing a computer to execute a method comprising:
based on captured image data, detecting a subject area that partially includes a subject to be detected;
identifying a specific distance range in which a probability that the subject exists reaches a threshold based on information that defines a relationship between a distance range from a center of the subject area and a probability that the subject exists in at least a part of an area inside the distance range, the information being stored in a memory; and
performing shooting control based on data corresponding to the subject area among the captured image data, and on the specific distance range, the shooting control being performed so that a contribution of data corresponding to a position inside the specific distance range is larger than a contribution of data corresponding to a position outside the specific distance range.

* * * * *